US009993725B2

(12) United States Patent
Yoguchi

(10) Patent No.: US 9,993,725 B2
(45) Date of Patent: Jun. 12, 2018

(54) OPERATING DEVICE

(75) Inventor: Aki Yoguchi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 953 days.

(21) Appl. No.: 14/382,584

(22) PCT Filed: Jun. 21, 2012

(86) PCT No.: PCT/JP2012/065920
§ 371 (c)(1),
(2), (4) Date: Sep. 3, 2014

(87) PCT Pub. No.: WO2013/136540
PCT Pub. Date: Sep. 19, 2013

(65) Prior Publication Data
US 2015/0031458 A1 Jan. 29, 2015

(30) Foreign Application Priority Data

Mar. 13, 2012 (JP) ................................ 2012-056526

(51) Int. Cl.
*A63F 13/24* (2014.01)
*H01H 25/06* (2006.01)
(Continued)

(52) U.S. Cl.
CPC .............. *A63F 13/24* (2014.09); *A63F 13/06* (2013.01); *H01H 25/002* (2013.01);
(Continued)

(58) Field of Classification Search
CPC .. H01H 25/002; H01H 25/004; H01H 25/006; H01H 25/008; H01H 25/04; H01H 25/06
See application file for complete search history.

(56) References Cited

U.S. PATENT DOCUMENTS 5,406,040 A * 4/1995 Johnson ............. G05G 9/04785
200/4
5,498,843 A * 3/1996 Date ........................ G06F 3/033
200/5 A
(Continued)

FOREIGN PATENT DOCUMENTS

CN 2133017 Y 5/1993
CN 1763703 A 4/2006
(Continued)

OTHER PUBLICATIONS

Office Action for corresponding JP application 2012-056525, 7 pages, dated Jan. 5, 2016.
(Continued)

*Primary Examiner* — Jay Liddle
*Assistant Examiner* — Alex F. R. P. Rada, II
(74) *Attorney, Agent, or Firm* — Matthew B. Dernier, Esq.

(57) ABSTRACT

An operating device has an operating shaft, engagement protrusions, and a movable body. The movable body can rotate relative to the operating shaft. The movable body engages with the engagement protrusions at positions separate from its rotation center. The movable body rotates relative to the operating shaft through the engagement with the engagement protrusions according to the translation of the operating shaft. A base abuts against the movable body in the rotational direction of this movable body and receives a force due to the movement of the operating shaft from the movable body. Sensors detect the force acting on the base. According to this, an operating device having a novel structure allowing detection of the translation of the operating shaft is implemented.

12 Claims, 12 Drawing Sheets

(51) Int. Cl.
*A63F 13/20* (2014.01)
*H01H 25/00* (2006.01)
*H01H 25/04* (2006.01)

(52) U.S. Cl.
CPC ........ *H01H 25/006* (2013.01); *H01H 25/008* (2013.01); *H01H 25/04* (2013.01); *H01H 25/06* (2013.01); *A63F 2300/1006* (2013.01); *A63F 2300/1043* (2013.01); *H01H 2025/004* (2013.01); *H01H 2025/043* (2013.01)

(56) References Cited

U.S. PATENT DOCUMENTS

| | | | | |
|---|---|---|---|---|
| 5,691,517 | A * | 11/1997 | Yamamoto | G05G 9/047 200/6 A |
| 5,744,765 | A * | 4/1998 | Yamamoto | G05G 9/047 200/339 |
| 6,394,906 | B1 | 5/2002 | Ogata | |
| 7,439,461 | B2 | 10/2008 | Sawada | |
| 8,410,379 | B2 | 4/2013 | Kuno | |
| 8,845,102 | B2 * | 9/2014 | Inoue | A61B 3/0075 351/208 |
| 9,630,101 | B2 * | 4/2017 | Togawa | G06F 3/0338 |
| 2005/0139458 | A1 | 6/2005 | Komatsu | |
| 2005/0284737 | A1 * | 12/2005 | Shitanaka | H01H 25/04 200/5 R |
| 2006/0117894 | A1 | 6/2006 | Sawada | |
| 2006/0146019 | A1 * | 7/2006 | Ahlgren | G06F 3/0338 345/161 |
| 2006/0238505 | A1 * | 10/2006 | Ahlgren | G06F 3/0338 345/161 |
| 2007/0202956 | A1 | 8/2007 | Ogasawara | |
| 2009/0294259 | A1 | 12/2009 | Kuno | |

FOREIGN PATENT DOCUMENTS

| | | |
|---|---|---|
| CN | 101541588 A | 9/2009 |
| JP | 09190742 A | 7/1997 |
| JP | 2004-184127 A | 7/2004 |
| JP | 2005317376 A | 11/2005 |
| JP | 2006-120399 A | 5/2006 |
| JP | 2008-269802 A | 11/2008 |
| JP | 2009-093899 A | 4/2009 |
| JP | 2009244920 A | 10/2009 |
| JP | 2011165380 A | 8/2011 |
| WO | 2009/119729 A1 | 10/2009 |

OTHER PUBLICATIONS

International Preliminary Report on Patentability and Written Opinion for corresponding application PCT/JP2012/065920, dated Sep. 25, 2014.
International Search Report for corresponding application PCT/JP2012/065920, dated Oct. 2, 2012.
Office Action for corresponding CN application 201280071274.9, 9 pages, dated Dec. 29, 2015.

* cited by examiner

OPERATING DEVICE

TECHNICAL FIELD

The present invention relates to an operating device having an operating shaft operated by a user.

BACKGROUND ART

Conventionally, an operating device having an operating shaft operated by a user is utilized as an input device for electronic apparatus such as a game device. Portable electronic apparatus disclosed by the U.S. Patent Application Publication No. 2007/0202956 specification has an operating shaft (analog stick) supported translatably in the radial direction. In the U.S. Pat. No. 6,394,906 specification, a base part of an operating shaft is supported by a rotatable support shaft so that the operating shaft can be tilted. The tilt direction and the magnitude of the tilt are calculated from the rotation angle of the support shaft.

SUMMARY

The conventional operating shaft that is translatable like that disclosed in U.S. Patent Application Publication No. 2007/0202956 cannot be tilted and rotated around its shaft center and the operation mode is limited. If these kinds of motion are enabled in addition to translation, the operability of the operating shaft and the amusingness of games can be enhanced. Thus, an operating shaft having a novel structure enabling these kinds of motion is desired. An operating device according to one aspect of the present invention includes an operating shaft, an engagement portion located separately from the shaft center of the operating shaft, and a movable body that is capable of rotation relative to the operating shaft in the circumferential direction of the operating shaft and engages with the engagement portion. The movable body rotates relative to the operating shaft through engagement with the engagement portion according to translation of the operating shaft in a radial direction. The operating device further includes a base that abuts against the movable body in the rotational direction of the movable body and receives a force due to movement of the operating shaft from the movable body and a sensor that detects a force acting on the base. According to this operating device, an operating device with a novel structure having the operating shaft translatable in the radial direction is implemented.

With the structure of U.S. Pat. No. 6,394,906, it is difficult to enable the motion of the operating shaft in a plane perpendicular to the axis of the operating shaft, such as translation in the radial direction of the operating shaft and rotation around the shaft center of the operating shaft, and detect the amount of motion of the operating shaft in the axial direction. An operating device according to one aspect of the present invention includes an operating shaft capable of first motion that is motion in the axial direction and second motion that is motion in a plane perpendicular to the axial direction and at least one spring that is a spring that receives motion of the operating shaft to be elastically deformed. The at least one spring generates an elastic force of a first direction that is the axial direction according to the first motion and generates an elastic force of a second direction that is a direction along the plane perpendicular to the axial direction according to the second motion. The operating device further includes a sensor that detects a force according to the elastic force in the first direction and a force according to the elastic force in the second direction. According to this operating device, the amount of motion of the operating shaft in the axial direction and the amount of motion in the plane perpendicular to the axial direction can be detected.

BRIEF DESCRIPTION OF DRAWINGS

FIG. 7(a) shows the movable bodies when the operating shaft is at the initial position and FIG. 7(b) shows the movable bodies when the operating shaft is translated in the radial direction.

FIG. 9(a) shows the movable bodies when the operating shaft is at the initial position and FIG. 9(b) shows the movable bodies when the operating shaft is rotated around the shaft center.

DESCRIPTION OF EMBODIMENT

Figure 1:
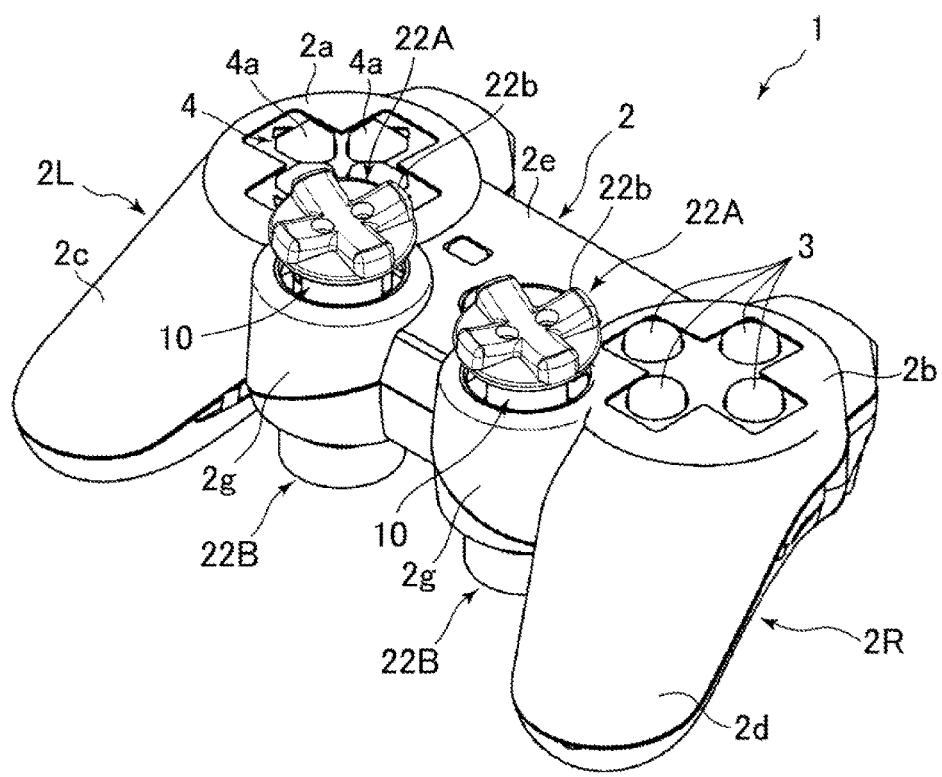
FIG. 1 is a perspective view of an operating device according to one embodiment of the present invention.

One embodiment of the present invention will be described below with reference to the drawings. FIG. 1 is a perspective view of an operating device 1 according to the embodiment of the present invention.

As shown in FIG. 1, a housing 2 of the operating device 1 of this example has held portions 2R and 2L for being held by a user with hands at its right part and left part, respectively. Plural (in this example, four) buttons 3 are provided on the upper surface of a front part 2b of the right held portion 2R. The held portion 2R has a grip 2d for being grasped by the user, extending rearward from the front part 2b. Direction keys 4 are provided at a front part 2a of the left held portion 2L. The direction keys 4 have four protrusions 4a disposed in a cross manner. The held portion 2L also has a grip 2c for being grasped by the user, extending rearward from the front part 2a. The front part 2b of the held portion 2R and the front part 2a of the held portion 2L are connected by a connecting portion 2e. An operating shaft assembly 10 is disposed between the connecting portion 2e and the left grip 2c. Furthermore, the operating shaft assembly 10 is disposed also between the connecting portion 2e and the right grip 2c. The operating shaft assemblies 10 are housed in assembly housing parts 2g that are formed between the connecting portion 2e and the grips 2c and 2d and have a tubular shape. The operating device 1 does not necessarily need to have the two operating shaft assemblies 10. That is, the operating shaft assembly 10 may be permitted not to be disposed at either one of the part between the connecting portion 2e and the grip 2c or the part between the connecting portion 2e and the grip 2d.

Figure 2:
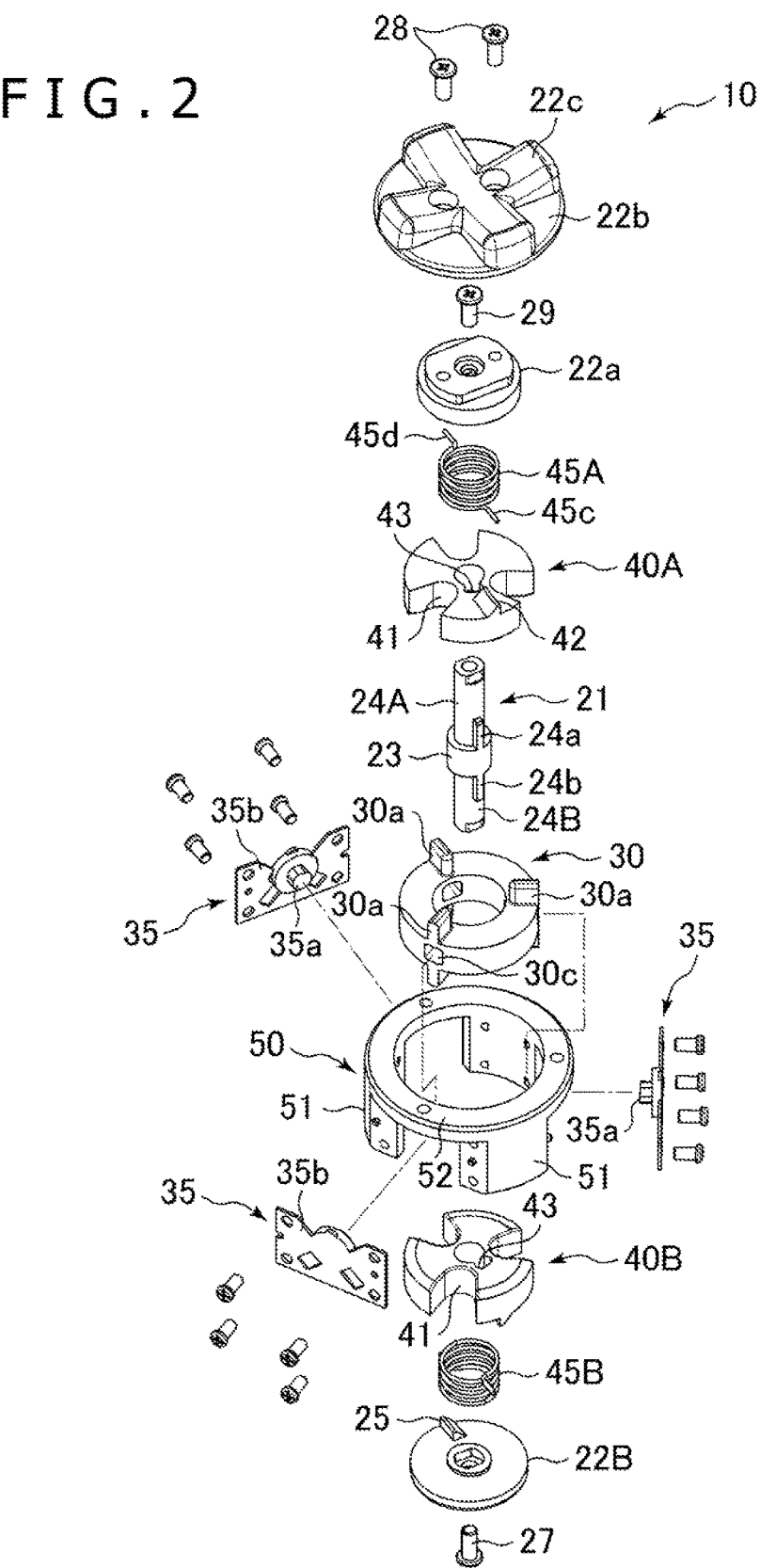
FIG. 2 is an exploded perspective view of an operating shaft assembly included in the operating device.
Figure 3:
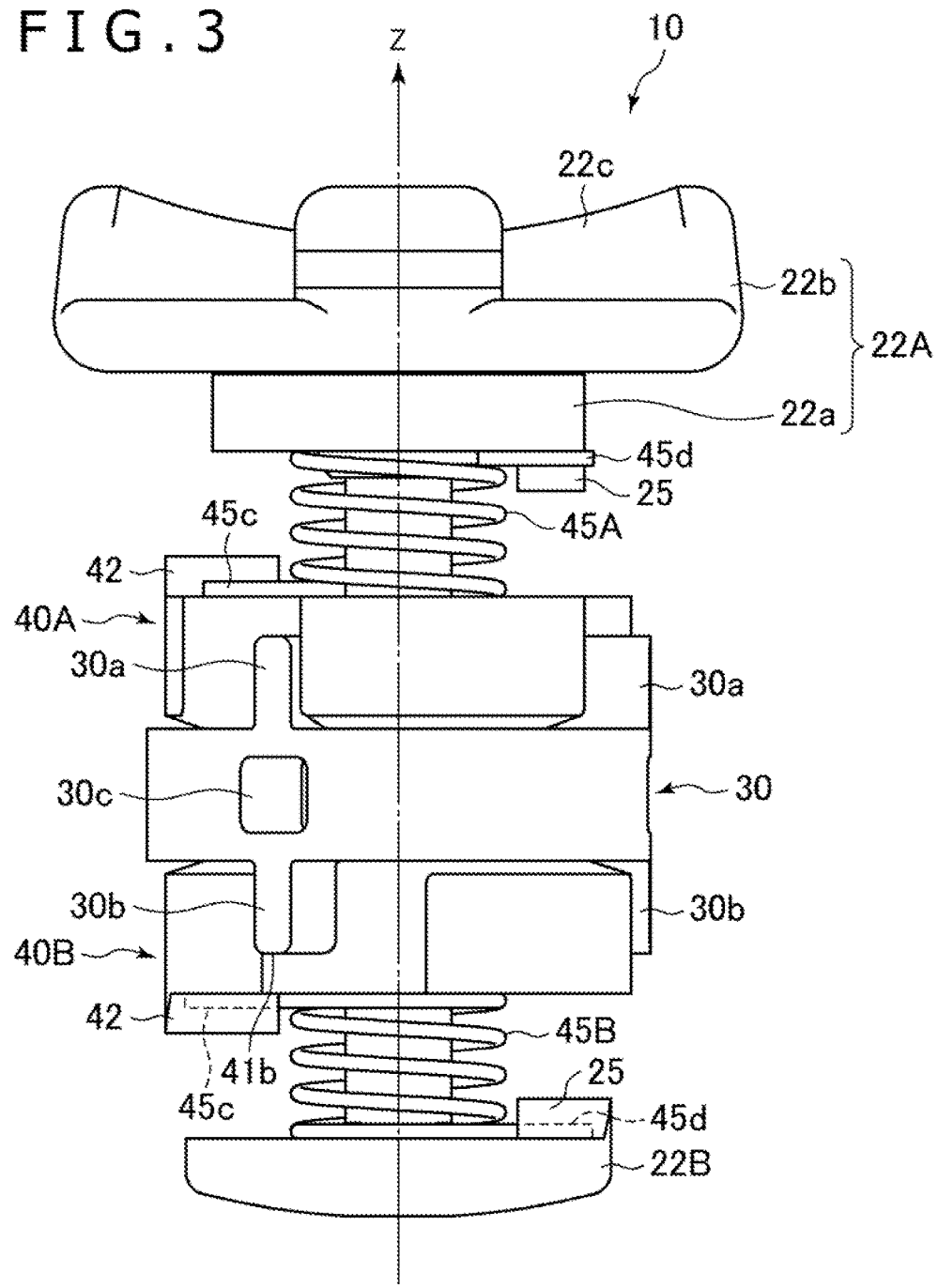
FIG. 3 is a side view of the operating shaft assembly.
Figure 4:
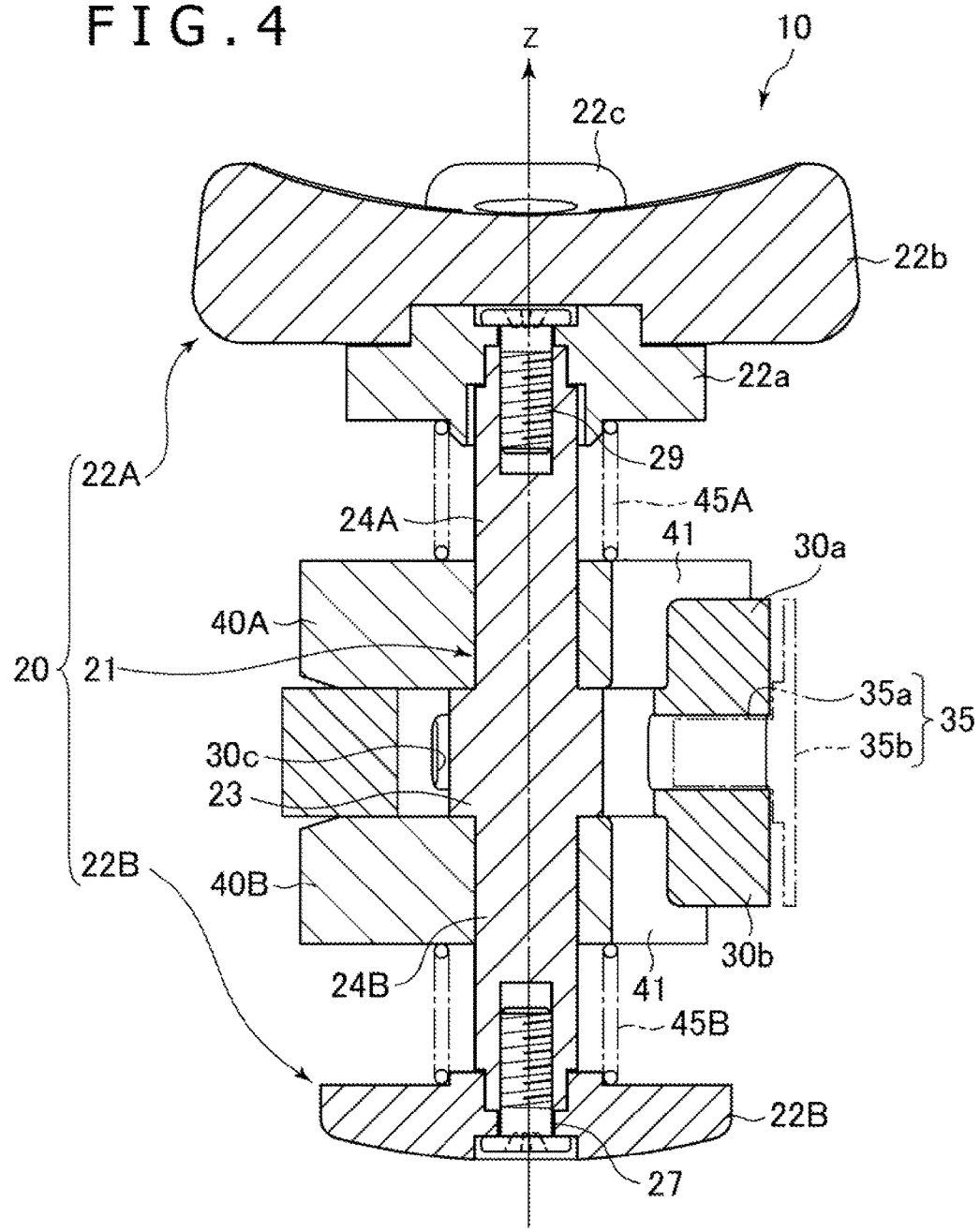
FIG. 4 is a sectional view of the operating shaft assembly represented with a plane passing through the shaft center of an operating shaft employed as the cutting plane.
Figure 5:
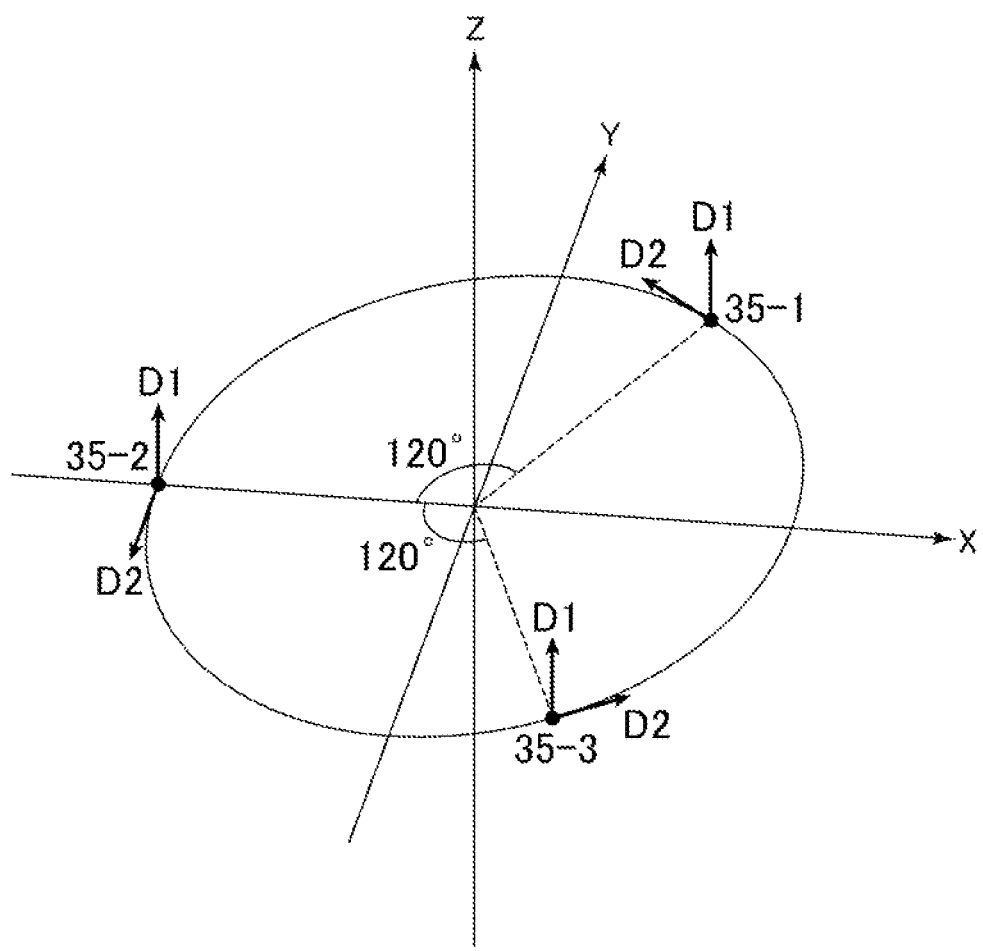
FIG. 5 is a diagram for explaining directions in which sensors configuring the operating shaft assembly detect a force.

FIG. 2 is an exploded perspective view of the operating shaft assembly 10 included in the operating device 1. FIG. 3 is a side view of the assembly 10. FIG. 4 is a sectional view of the assembly 10 represented with a plane passing through the shaft center of an operating shaft 20 to be described later employed as the cutting plane. FIG. 5 is a diagram for explaining the directions in which sensors 35 included in the assembly 10 detect a force. As described in detail later, the assembly 10 has plural (in this example, three) sensors 35. Numerals 35-1 to 35-3 in FIG. 5 each indicate a respective one of the three sensors 35. In the following description, numerals 35-1 to 35-3 are used only when a specific sensor is represented. In FIG. 5, the Z-axis is a reference axis along the shaft center of the operating shaft 20 at the initial position (operating shaft 20 at the position shown in FIG. 4). The X-axis and the Y-axis are reference axes that are each orthogonal to the Z-axis and are orthogonal to each other. That is, the X-axis and the Y-axis are both a reference axis along a radial direction of the operating shaft 20 at the initial position. In this example, the reference axis on which the sensor 35-2 is disposed is defined as the X-axis.

As shown in FIG. 4, the assembly 10 has the operating shaft 20. The operating shaft 20 of this example has a shaft main body 21, a first operating portion 22A provided at the upper end of the shaft main body 21, and a second operating portion 22B provided at the lower end of the shaft main body 21. The user can operate the operating shaft 20 in such a manner as to clamp the first operating portion 22A and the second operating portion 22B with a finger disposed on the front surface side of the operating device 1 (e.g. thumb) and a finger disposed on the back surface side (e.g. index finger or middle finger). For example, while clamping the operating portions 22A and 22B, the user can translate the operating shaft 20 in its radial direction and tilt the operating shaft 20.

As shown in FIG. 4, the first operating portion 22A has a flange 22a attached to the upper end of the shaft main body 21. The flange 22a has a shape expanding from the shaft main body 21 in the radial direction (in this example, circular shape). Furthermore, the first operating portion 22A has a pad 22b attached to the upper side of the flange 22a. The pad 22b of this example has a substantially circular shape as a whole and a protrusion 22c having a cross shape is formed on its upper surface (see FIG. 2). The protrusion 22c does not necessarily need to be formed. In this example, the flange 22a is attached to an end surface of the shaft main body 21 by a screw 29. The pad 22b is attached to the upper side of the flange 22a by screws 28 (see FIG. 2). The second operating portion 22B also has a shape expanding from the shaft main body 21 in the radial direction (in this example, circular shape). The second operating portion 22B is attached to an end surface of the shaft main body 21 by a screw 27.

As shown in FIGS. 2 and 4, the assembly 10 has a base 30 surrounding the shaft main body 21. The base 30 of this example has a substantially circular ring shape. The above-described operating portions 22A and 22B are located on the opposite side to each other across the base 30.

As shown in FIG. 2, the assembly 10 has the plural sensors 35 attached to the base 30. The sensors 35 are disposed at intervals along the circumferential direction of the operating shaft 20. In this example, the three sensors 35 are disposed at equal intervals (120-degree intervals).

As shown in FIG. 2, the assembly 10 includes a frame 50. The frame 50 is fixed by the inside of the housing 2 of the operating device 1. The frame 50 includes plural (in this example, three) wall parts 51 surrounding the outer circumference of the base 30. The sensor 35 is disposed between two wall parts 51 adjacent to each other in the circumferential direction and edges of the sensor 35 are attached to the two wall parts 51 by screws. The frame 50 has a ring-shaped part 52 at its upper part and the three wall parts 51 are connected to each other via the ring-shaped part 52.

The sensor 35 engages with the base 30 in such a manner as to be capable of receiving, from the base 30, a force of the axis direction of the operating shaft 20 (Z-axis direction) and a force of a direction along a plane perpendicular to the axis direction (horizontal plane including the X-axis and the Y-axis). In this example, as shown in FIG. 2, the sensor 35 has an engagement part 35a protruding from a sensor main body 35b toward the shaft center of the operating shaft 20. Plural holes 30c (in this example, holes penetrating the base 30 in the radial direction) are formed in the outer circumferential surface of the base 30 and the engagement part 35a fits into the hole 30c. By this engagement structure, a force of the Z-axis direction and a force of a direction along a plane perpendicular to the Z-axis act on the sensor 35 from the base 30. In this example, a force of the Z-axis direction and a force of the direction of a tangent to a circle centered at the Z-axis are applied from the base 30 to the sensor 35. For example, a force of the Z-axis direction and a force of the Y-axis direction are applied to the sensor 35-2 (see FIG. 5). The base 30 is supported by the engagement parts 35a and the motion thereof is restricted by the sensors 35.

The sensor 35 includes a strain gauge and detects the force applied from the base 30. As shown in FIG. 5, each sensor 35 has two detection directions D1 and D2 intersecting each other. The first detection direction D1 of each sensor 35 is a direction intersecting the plane perpendicular to the Z-axis. In this example, the first detection direction D1 is set the Z-axis direction. For example, the sensor 35 outputs a positive value when a force of the positive direction of the Z-axis acts on the engagement part 35a, and outputs a negative value when a force of the negative direction of the Z-axis acts on the engagement part 35a. The second detection direction D2 of each sensor 35 is set along a plane perpendicular to the Z-axis. The second detection directions D2 of the plural sensors 35 are set at least two directions intersecting each other. Specifically, the second detection direction D2 of each sensor 35 is set the direction of a tangent to a circle centered at the Z-axis. In the example of FIG. 5, the second detection direction D2 of the sensor 35-2 is the negative direction of the Y-axis. The second detection direction D2 of the sensor 35-3 is the direction inclined by 120 degrees to the second detection direction D2 of the sensor 35-2. The second detection direction D2 of the sensor 35-1 is the direction further inclined by 120 degrees to the second detection direction D2 of the sensor 35-3. The sensor 35 outputs a positive value when receiving a force of the positive direction in the second detection direction D2, and outputs a negative value when receiving a force of the negative direction in the second detection direction D2.

As shown in FIGS. 2 and 4, the assembly 10 has a first movable body 40A and a second movable body 40B disposed on the opposite side to each other across the base 30.

The first movable body 40A is disposed on the upper side of the base 30 and located between the first operating portion 22A at the upper end of the operating shaft 20 and the base 30. The second movable body 40B is disposed on the lower side of the base 30 and located between the second operating portion 22B at the lower end of the operating shaft 20 and the base 30. The first movable body 40A is opposed to the base 30 in the axial direction of the operating shaft 20 and supported by the base 30 in the axial direction. That is, the surface of the first movable body 40A facing the base 30 (lower surface) is in contact with the base 30. The lower surface of the first movable body 40A and the upper surface of the base 30 in contact with each other are horizontal, i.e. perpendicular to the Z-axis. Therefore, the first movable body 40A can move on the base 30 horizontally, i.e. in the X-Y plane, and is not displaced in the Z-axis direction. Similarly, the second movable body 40B is opposed to the base 30 in the axial direction of the operating shaft 20 and supported by the base 30 in the axial direction. That is, the surface of the second movable body 40B facing the base 30 (upper surface) is in contact with the base 30. The upper surface of the second movable body 40B and the lower surface of the base 30 in contact with each other are horizontal, i.e. perpendicular to the Z-axis. Therefore, the second movable body 40B also can move on the base 30 horizontally, i.e. in the X-Y plane, and is not displaced in the Z-axis direction. The first movable body 40A and the second movable body 40B are each pressed against the base 30 by springs 45A and 45B to be described later.

The shaft main body 21 has a large-diameter part 23 at its substantially center part. The large-diameter part 23 has a larger diameter than the other part of the shaft main body 21. Specifically, the large-diameter part 23 has a larger diameter than the part extending from the large-diameter part 23 toward the first operating portion 22A (hereinafter, shaft part 24A) and the part extending from the large-diameter part 23 toward the second operating portion 22B (hereinafter, shaft part 24B). The movable bodies 40A and 40B hold the shaft parts 24A and 24B, respectively, and sandwich the large-diameter part 23 in the axial direction of the operating shaft 20. Specifically, in the movable bodies 40A and 40B, holes that have an inner diameter corresponding to (identical to) the thickness of the shaft parts 24A and 24B and penetrate the movable bodies 40A and 40B in the Z-axis direction are formed. The shaft parts 24A and 24B are inserted into the holes of the movable bodies 40A and 40B, respectively. Due to this, the movable bodies 40A and 40B move in the radial direction together with the operating shaft 20 and tilt together with the operating shaft 20.

The base 30 has a ring shape and surrounds the large-diameter part 23. In the state in which the operating shaft 20 is at the initial position (state in which it is not moved in any direction), the shaft center of the operating shaft 20 (Z-axis), the center line of the hole of the base 30, and the center lines of the holes of the movable bodies 40A and 40B are identical. As shown in FIG. 4, the inner diameter of the base 30 is larger than the outer diameter of the large-diameter part 23. That is, a space is set between the inner circumferential surface of the base 30 and the outer circumferential surface of the large-diameter part 23. This allows the operating shaft 20 to move in the radial direction and tilt inside the base 30.

As shown in FIGS. 2 and 4, the assembly 10 has the springs 45A and 45B. The spring 45A is disposed between the first movable body 40A and the first operating portion 22A. The spring 45B is disposed between the second movable body 40B and the second operating portion 22B. In this example, the shaft part 24A is inserted into the inside of the spring 45A and the shaft part 24B is inserted into the inside of the spring 45B.

Figure 6:
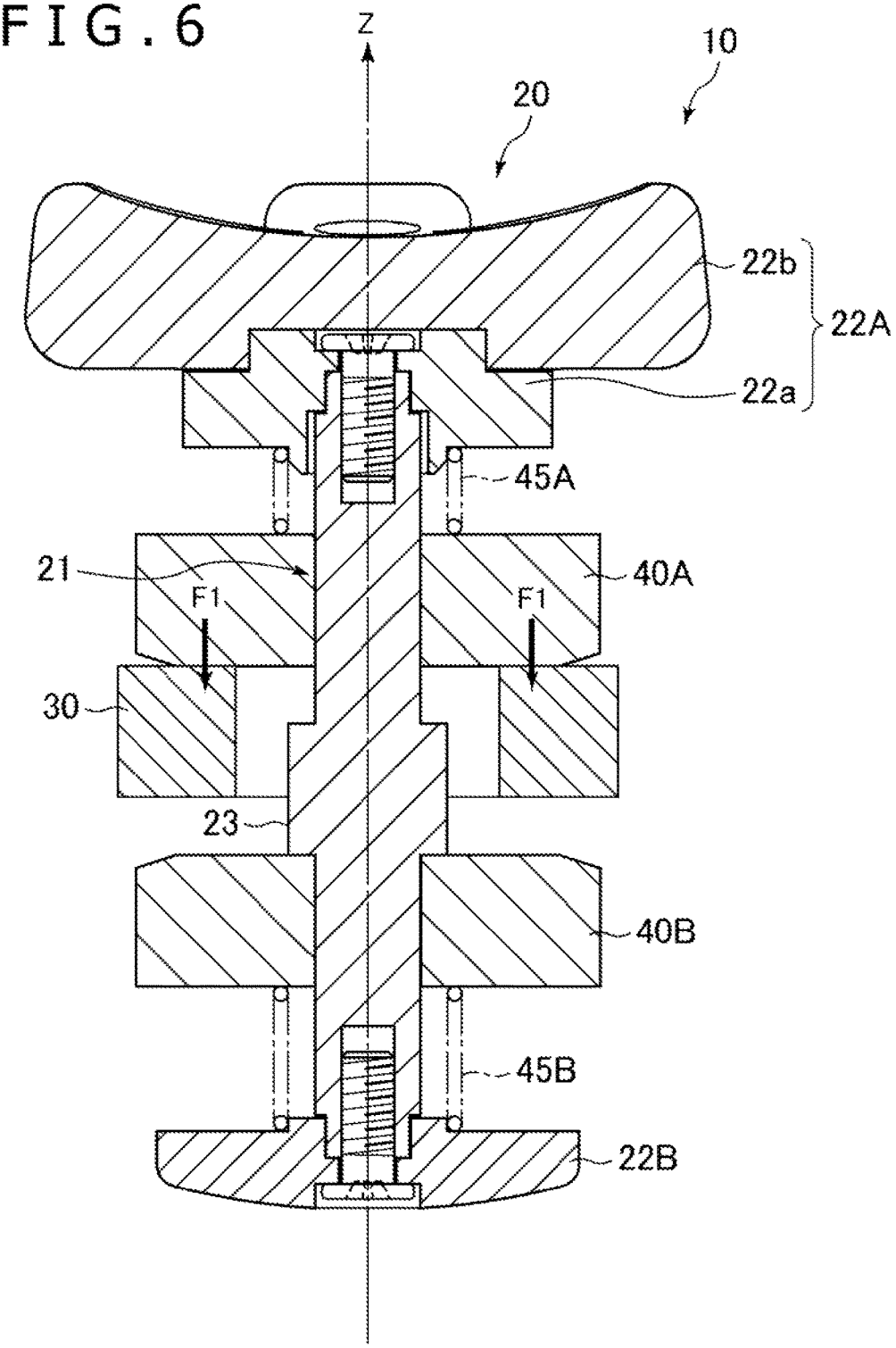
FIG. 6 shows a state in which the operating shaft is moved in the axial direction thereof.
Figure 7:
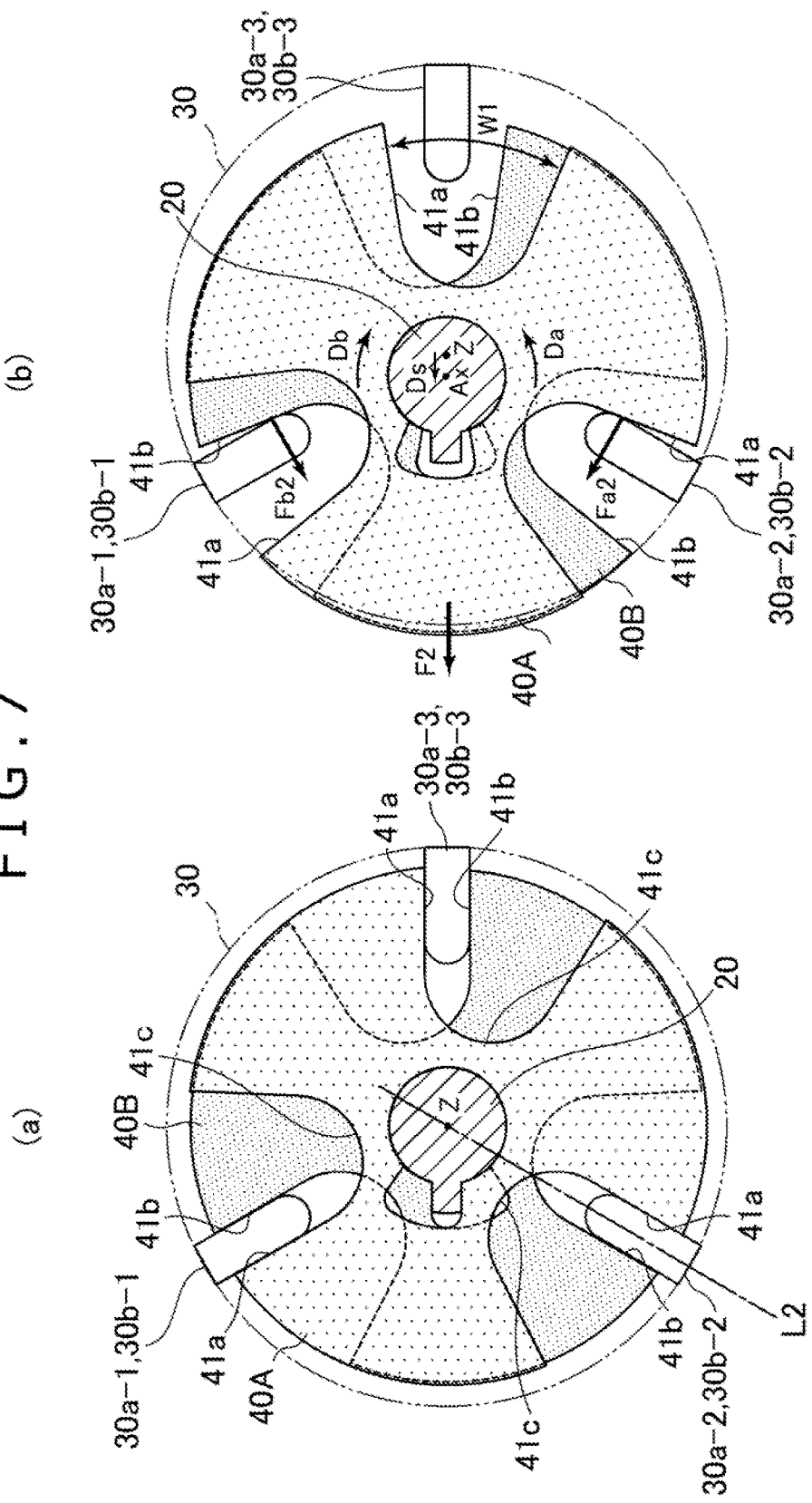
FIG. 7 is a diagram for explaining the translation of the operating shaft in a radial direction. States when movable bodies are seen along the axial direction of the operating shaft are shown in this diagram.
Figure 8:
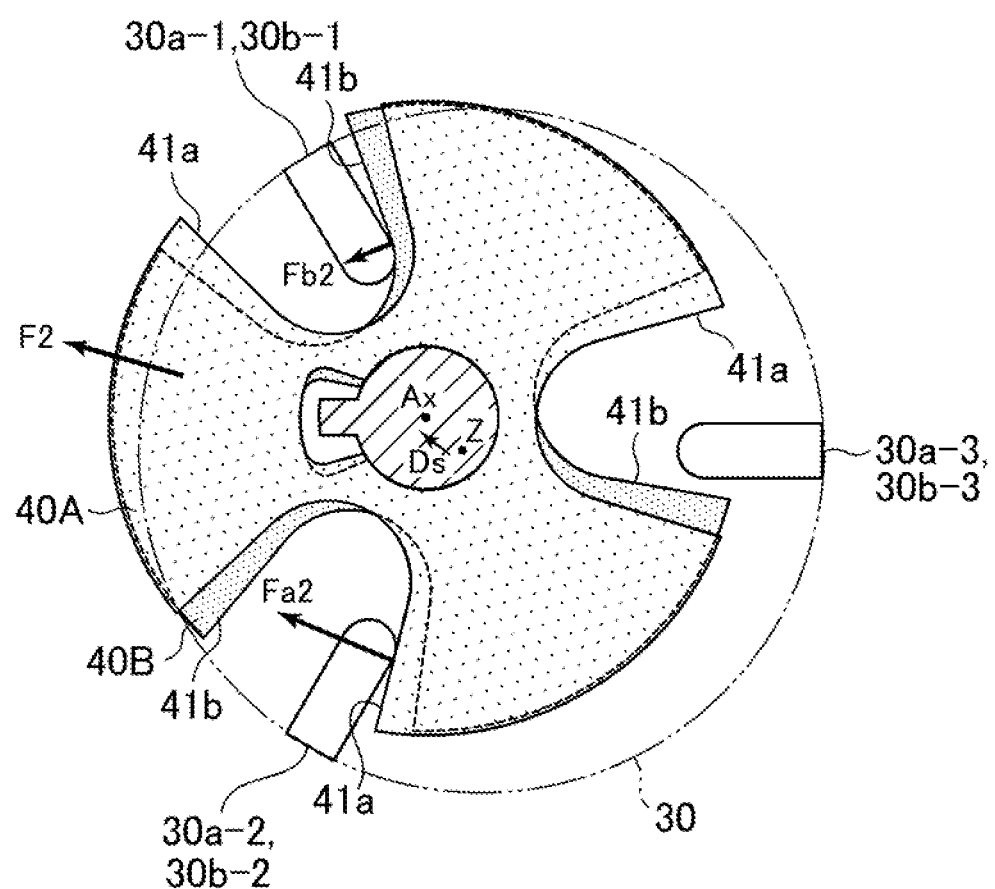
FIG. 8 is a diagram for explaining the translation of the operating shaft in a radial direction.
Figure 9:
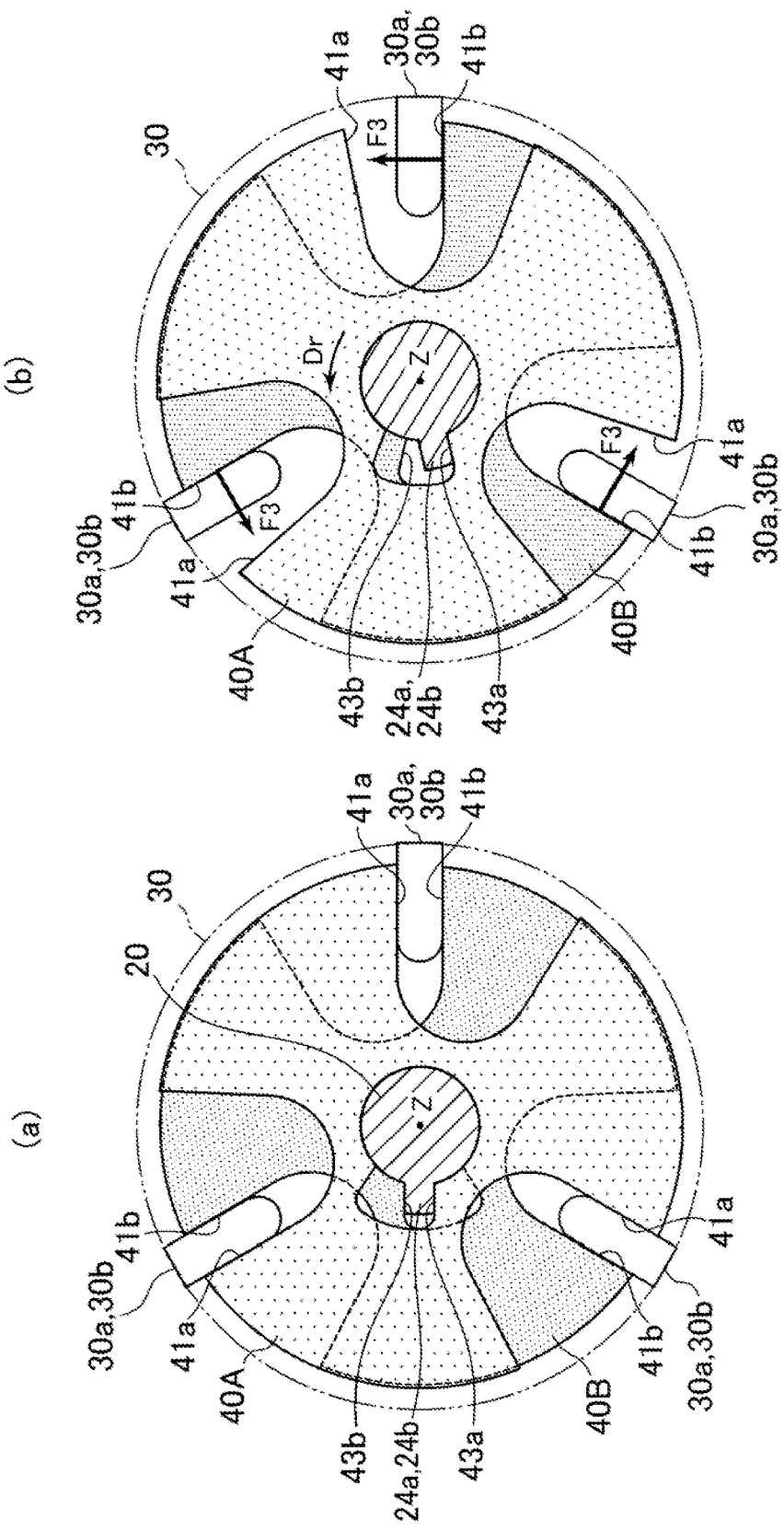
FIG. 9 is a diagram for explaining the rotation of the operating shaft around the shaft center and states when the movable bodies are seen along the axial direction of the operating shaft are shown also in this diagram.
Figure 10:
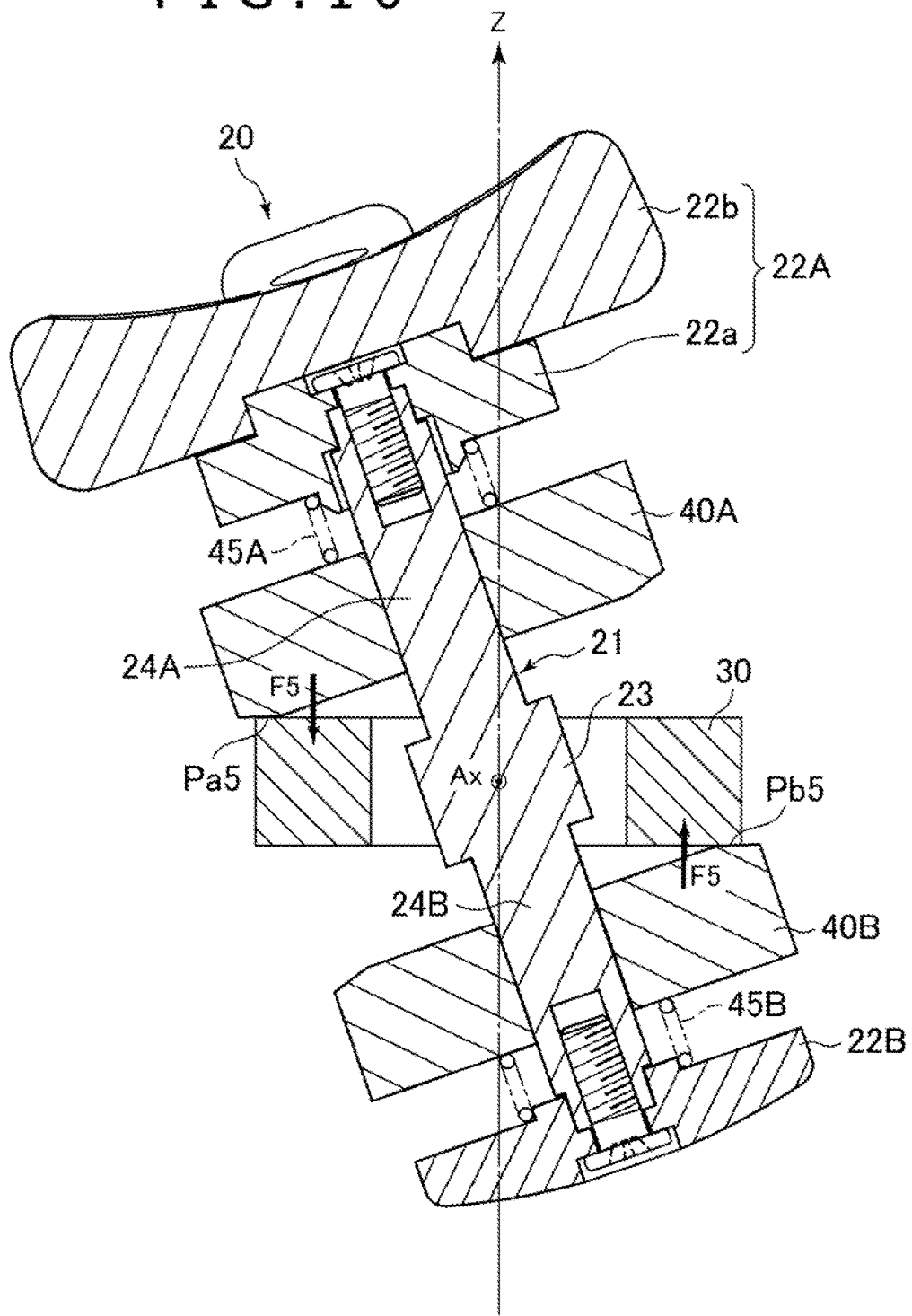
FIG. 10 shows a state in which the operating shaft is tilted.

FIGS. 6 to 10 are diagrams for explaining the motion of the respective members configuring the assembly 10. FIG. 6 shows a state in which the operating shaft 20 is moved in its axial direction. FIGS. 7 and 8 are diagrams for explaining the translation of the operating shaft 20 in a radial direction. In these diagrams, states when the movable bodies 40A and 40B are seen along the axial direction of the operating shaft 20 are shown. FIG. 7(*a*) shows the movable bodies 40A and 40B when the operating shaft 20 is at the initial position. FIGS. 7(*b*) and 8 show the movable bodies 40A and 40B when the operating shaft 20 is translated in a radial direction. FIG. 9 is a diagram for explaining the rotation of the operating shaft 20 around the shaft center. Also in this diagram, states when the movable bodies 40A and 40B are seen along the axial direction of the operating shaft 20 are shown. FIG. 9(*a*) shows the movable bodies 40A and 40B when the operating shaft 20 is at the initial position and FIG. 9(*b*) shows the movable bodies 40A and 40B when the operating shaft 20 is rotated around the shaft center. FIG. 10 shows a state in which the operating shaft 20 is tilted.

As shown in these diagrams, the operating shaft 20 is capable of translation in the axial direction of this operating shaft 20 (Z-axis direction) (FIG. 6) and tilt (tilt about an arbitrary axis Ax along a radial direction, FIG. 10). Furthermore, the operating shaft 20 is capable of motion in a plane perpendicular to the shaft center of the operating shaft 20 (Z-axis). The motion in a plane perpendicular to the shaft center of the operating shaft 20 is specifically translation in the radial direction of the operating shaft 20 (FIGS. 7 and 8) and rotation around the shaft center of the operating shaft 20 (Z-axis) (FIG. 9). In the following description, the axial direction of the operating shaft 20 at the initial position will be referred to as the Z-axis direction.

The movable bodies 40A and 40B and the base 30 are so formed that a force attributed to the elastic force of the springs 45A and 45B acts on the base 30 from the movable bodies 40A and 40B. The force acting on the base 30 from the movable bodies 40A and 40B acts in a direction according to the motion of the operating shaft 20. In the present embodiment, the movable bodies 40A and 40B are supported by the base 30 in the Z-axis direction. Therefore, when the operating shaft 20 moves in the Z-axis direction and tilts, a force of the Z-axis direction (F1 (FIG. 6), F5 (FIG. 10)) acts on the base 30 from the movable bodies 40A and 40B. Furthermore, when the operating shaft 20 moves in a plane perpendicular to the Z-axis, a force of a direction along the plane perpendicular to the Z-axis acts on the base 30 from the movable bodies 40A and 40B. The force of a direction along the plane perpendicular to the Z-axis is specifically a force of a radial direction of the operating shaft 20 (F2 (FIGS. 7 and 8)) and a rotational force around the operating shaft 20 (rotational force (moment) based on plural F3 (FIG. 9)). The force acting on the base 30 is detected by the sensors 35.

The springs 45A and 45B generate an elastic force in the axial direction of the operating shaft 20 and an elastic force of a direction along a plane perpendicular to the axial direction of the operating shaft 20. Each of the springs 45A and 45B of this example is a compression and torsion coil spring. That is, the springs 45A and 45B are capable of compressive deformation in the axial direction of the operating shaft 20 and capable of torsional deformation around the operating shaft 20. Therefore, the springs 45A and 45B generate an elastic force due to torsional deformation (hereinafter, torsional elastic force) as the elastic force of a direction along a plane perpendicular to the axial direction of the operating shaft 20. As described later, when the operating shaft 20 moves in its radial direction (FIGS. 7 and 8) and when the operating shaft 20 rotates around its shaft center (FIG. 10), a force attributed to the torsional elastic force of the springs 45A and 45B (F2 (FIGS. 7 and 8), rotational force (moment) based on plural F3 (FIG. 9)) acts on the base 30. Furthermore, when the operating shaft 20 is translated in the Z-axis direction (FIG. 6) and when it tilts (FIG. 10), a force attributed to the compressive deformation of the springs 45A and 45B (F1 (FIG. 6), F5 (FIG. 10)) acts on the base 30 (hereinafter, elastic force due to compressive deformation will be referred to as compressive elastic force).

Details of the operating shaft 20, the movable bodies 40A and 40B, and the base 30 will be described below.

[Structure Relating to Motion in Axial Direction]

The movable bodies 40A and 40B hold the operating shaft 20 in such a manner as to be movable relative to the operating shaft 20 in the axial direction. Specifically, as described above, the shaft parts 24A and 24B of the operating shaft 20 are inserted into the holes formed in the movable bodies 40A and 40B, respectively. The movable bodies 40A and 40B can move relative to the operating shaft 20 along the shaft parts 24A and 24B. In other words, as shown in FIG. 6, the operating shaft 20 can move in parallel to its axial direction (Z-axis direction). Between the first movable body 40A and the first operating portion 22A, the spring 45A exerts a compressive elastic force against approaching of them. Furthermore, between the second movable body 40B and the second operating portion 22B, the spring 45B exerts a compressive elastic force against approaching of them. Therefore, when the operating shaft 20 moves in its axial direction, a compressive elastic force according to the amount of movement thereof evenly acts on the three sensors 35.

Specifically, as shown in FIG. 6, when the operating shaft 20 moves in the negative direction of the Z-axis, the spring 45A is compressed due to approaching of the first operating portion 22A and the first movable body 40A. As a result, the compressive elastic force according to the amount of movement of the operating shaft 20 is applied to the whole of the base 30 and the force F1 of the negative direction of the Z-axis evenly acts on the three sensors 35. Conversely, when the operating shaft 20 moves in the positive direction of the Z-axis, the spring 45B is compressed due to approaching of the second operating portion 22B and the second movable body 40B. As a result, a force of the positive direction of the Z-axis evenly acts on the three sensors 35. The amount of movement of the operating shaft 20 is calculated from the force detected by the sensors 35 in the first detection direction D1 (see FIG. 5).

As shown in FIG. 6, the second movable body 40B abuts against the operating shaft 20 in the axial direction. This causes the second movable body 40B to move together with the operating shaft 20 when the operating shaft 20 moves in the negative direction of the Z-axis (moves in the direction from the first operating portion 22A toward the second operating portion 22B). Specifically, the second movable body 40B abuts against the surface of the large-diameter part 23 of the operating shaft 20 on the lower side (on the side of the second operating portion 22B) (see FIG. 4). Therefore, when the operating shaft 20 moves in the negative direction of the Z-axis, the compressive elastic force of the spring 45B does not act as a reaction force against this motion. Furthermore, the spring 45A is set in such a state as to generate an initial compressive elastic force. Specifically, the distance between the first movable body 40A and the first operating portion 22A is shorter than the natural length of the spring 45A (length in the state in which the spring 45A is not receiving a load). Therefore, an initial load that compresses the spring 45A is imposed on the spring 45A in the state in which the operating shaft 20 is at the initial position, and the spring 45A exerts the initial compressive elastic force that presses the first movable body 40A and the first operating portion 22A to widen the interval therebetween. As a result, the movement of the operating shaft 20 in the negative direction of the Z-axis starts when an operating force exceeding the initial compressive elastic force of the spring 45A is applied to the operating shaft 20. Due to this, the motion of the operating shaft 20 not intended by the user is suppressed and the operability of the operating shaft 20 can be enhanced.

Similarly, the first movable body 40A abuts against the operating shaft 20 in the axial direction. This causes the first movable body 40A to move together with the operating shaft 20 when the operating shaft 20 moves in the positive direction of the Z-axis (direction from the second operating portion 22B toward the first operating portion 22A). Specifically, as shown in FIG. 4, the first movable body 40A abuts against the surface of the large-diameter part 23 of the operating shaft 20 on the upper side (on the side of the first operating portion 22A). The spring 45B is also set in such a state as to generate an initial compressive elastic force. Specifically, in the state in which the operating shaft 20 is at the initial position, the spring 45B exerts an elastic force that presses the second movable body 40B and the second operating portion 22B to widen the interval therebetween. Therefore, the movement of the operating shaft 20 in the positive direction of the Z-axis starts when a force exceeding the initial compressive elastic force of the spring 45B is applied to the operating shaft 20. In the state in which the operating shaft 20 is at the initial position, the force acting on the base 30 due to the initial compressive elastic force of the spring 45A and the force acting on the base 30 due to the initial compressive elastic force of the spring 45B cancel each other out.

[Structure Relating to Translation in Radial Direction]

The movable bodies 40A and 40B hold the operating shaft 20 as described above and move together with the operating shaft 20 in a radial direction at the time of the translation of the operating shaft 20 in the radial direction. Furthermore, the movable bodies 40A and 40B can rotate in the circumferential direction of the operating shaft 20 relative to this operating shaft 20. The assembly 10 is provided with engagement protrusions 30a and 30b that engage with the movable bodies 40A and 40B and rotate the movable bodies 40A and 40B according to the translation of the operating shaft 20 in the radial direction. As described later, the springs 45A and 45B are twisted due to the rotation of the movable bodies 40A and 40B.

In this example, the engagement protrusions 30a and 30b are formed on the base 30. As shown in FIGS. 2 and 3, the engagement protrusions 30a and 30b protrude from the upper surface and lower surface, respectively, of the base 30 and are located separately from the shaft center of the operating shaft 20 in the radial direction. The respective movable bodies 40A and 40B have engagement recesses 41. The movable bodies 40A and 40B of this example have a shape obtained by partially notching the circumferential part of a circular disc. Furthermore, the notched parts serve as the engagement recesses 41. The engagement protrusions 30a and 30b engage with the engagement recesses 41. Specifically, as shown in FIG. 7(*a*), the engagement protrusions 30a and 30b are disposed inside the engagement recesses 41. Furthermore, the engagement protrusions 30a and 30b abut against the inner surfaces of the engagement recesses 41 in the circumferential direction of the operating shaft 20 at positions separate from the rotation center of the movable bodies 40A and 40B (hereinafter, the parts against which the engagement protrusions 30a and 30b abut in the inner surfaces of the engagement recesses 41 will be referred to as abutting surfaces 41a and 41b, respectively). In FIG. 7(a), numerals 30a-1 to 30a-3 indicate three engagement protrusions 30a and numerals 30b-1 to 30b-3 indicate three engagement protrusions 30b (in the following description, numerals 30a-1 to 30a-3 and 30b-1 to 30b-3 are used in the case of representing the specific engagement protrusions 30a and 30b).

With reference to FIG. 7, the motion of the movable bodies 40A and 40B will be described. In FIGS. 7(a) and 7(b), the Z-axis indicates the position of the shaft center of the operating shaft 20 at the initial position. A direction indicated by symbol Ds in FIG. 7(b) is the movement direction of the operating shaft 20 and symbol Ax indicates the position of the shaft center of the operating shaft 20 after the movement. As shown in FIG. 7(b), at the time of the translation of the operating shaft 20 in a radial direction thereof, the abutting surfaces 41a and 41b of the engagement recesses 41 abut against the engagement protrusions 30a and 30b and thus the movable bodies 40A and 40B rotate while moving together with the operating shaft 20 in the radial direction. In this example, the base 30 has the plural engagement protrusions 30a and the first movable body 40A has the plural engagement recesses 41. Similarly, the base 30 has the plural engagement protrusions 30b and the second movable body 40B has the plural engagement recesses 41. At the time of the translation of the operating shaft 20 in the radial direction, the abutting surfaces 41a and 41b abut against any engagement protrusion 30a or 30b and thereby the movable bodies 40A and 40B rotate while moving together with the operating shaft 20 in the radial direction. As described above, the first movable body 40A is in contact with the horizontal upper surface of the base 30 and the second movable body 40B is in contact with the horizontal lower surface of the base 30. Therefore, at the time of the translation of the operating shaft 20 in a radial direction thereof, the movable bodies 40A and 40B are not displaced in the Z-axis direction.

As shown in FIG. 7(a), the abutting surfaces 41a and 41b are formed along a straight line L2 that passes through the engagement protrusions 30a and 30b and is along a radial direction. In this example, the respective engagement recesses 41 are formed symmetrically about the straight line L2. Furthermore, curved surfaces opened radially outward are formed at bottom parts 41c of the engagement recesses 41. The bottom part 41c of the engagement recess 41 does not necessarily need to be such a curved surface and may be a flat surface or a surface curved around the operating shaft 20. It is preferable that the positions of the bottom parts 41c, i.e. the depths of the engagement recesses 41, are so set that the engagement protrusions 30a and 30b do not abut against the bottom part 41c at the time of the movement of the operating shaft 20.

As shown in FIGS. 2 and 7, the plural engagement protrusions 30a are formed at intervals in the circumferential direction of the operating shaft 20. As shown in FIG. 7(a), in the state in which the operating shaft 20 is at the initial position, the plural engagement protrusions 30a abut against the abutting surfaces 41a of the plural engagement recesses 41 formed in the first movable body 40A. In this example, the base 30 has the three engagement protrusions 30a disposed at equal intervals (120 degrees) and the three engagement recesses 41 are formed in the first movable body 40A. Similarly, the base 30 has the three engagement protrusions 30b disposed at equal intervals (120 degrees) and the three engagement recesses 41 are formed in the second movable body 40B. In this example, the engagement protrusions 30a and 30b are formed at the same angular positions in the circumferential direction. That is, the engagement protrusions 30a and 30b are located on the opposite side to each other in the axial direction of the operating shaft 20 (see FIG. 3).

In the state in which the operating shaft 20 is at the initial position, the plural abutting surfaces 41a formed in the first movable body 40A abut against the engagement protrusions 30a in the same direction. In this example, as shown in FIG. 7(a), the abutting surfaces 41a all abut against the engagement protrusions 30a in the clockwise direction. In other words, the abutting surface 41a abuts against the side surface oriented in the anticlockwise direction in the outer surface of the engagement protrusion 30a. Due to this, at whatever angle the radial direction in which the operating shaft 20 moves is, any engagement protrusion 30a rotates the first movable body 40A in the anticlockwise direction. The number of engagement protrusion 30a is so set that the rotation of the first movable body 40A is caused at whatever angle the radial direction in which the operating shaft 20 moves is. Therefore, the number of engagement protrusion 30a is not necessarily limited to three and may be more.

In the example of FIG. 7(b), because the operating shaft 20 is moved in a radial direction (left direction in the diagram), the engagement protrusion 30a-2 abuts against the abutting surface 41a of the first movable body 40A to rotate the first movable body 40A. The other engagement protrusions 30a-1 and 30a-3 are separated from the abutting surface 41a of the first movable body 40A because the first movable body 40A rotates. As shown in FIG. 7(b), width W1 of the engagement recesses 41 is set large compared with the engagement protrusions 30a so that the rotation of the movable body 40A may be kept from being inhibited by the engagement protrusions 30a that do not contribute to the rotation of the movable bodies 40A and 40B.

As shown in FIG. 7(a), in the state in which the operating shaft 20 is at the initial position, the abutting surfaces 41b of the plural engagement recesses 41 formed in the second movable body 40B also abut against the engagement protrusions 30b in the same rotational direction. Due to this, at whatever angle the radial direction in which the operating shaft 20 moves is, any engagement protrusion 30b rotates the second movable body 40B.

The abutting surfaces 41b of the second movable body 40B abut against the engagement protrusions 30b in the opposite direction to the abutting surfaces 41a of the first movable body 40A. Specifically, as shown in FIG. 7(a), the abutting surfaces 41b of this example all abut against the engagement protrusions 30b in the anticlockwise direction. In other words, the abutting surface 41a abuts against the side surface oriented in the anticlockwise direction in the outer surface of the engagement protrusion 30a and the abutting surface 41b abuts against the side surface oriented in the clockwise direction in the outer surface of the engagement protrusion 30b. Therefore, when the operating shaft 20 moves in a radial direction, the movable bodies 40A and 40B rotate in the opposite directions to each other. In the example of FIG. 7(b), the first movable body 40A rotates around the operating shaft 20 in the anticlockwise direction (in a direction Da in the diagram) and the second movable body 40B rotates around the operating shaft 20 in the clockwise direction (in a direction Db in the diagram). The width of the engagement recesses 41 of the second movable body 40B is also set large compared with the engagement protrusions 30b so that the rotation of the second movable body 40B may be kept from being inhibited by the engagement protrusions 30b that do not contribute to the rotation of the second movable body 40B (in FIG. 7(b), engagement protrusions 30b-2 and 30b-3). As described above, the first movable body 40A is in contact with the horizontal upper surface of the base 30 and the second movable body 40B is in contact with the horizontal lower surface of the base 30. The movable bodies 40A and 40B are parallel to each other. When the operating shaft 20 moves in a radial direction thereof, the movable bodies 40A and 40B rotate in the opposite directions to each other while keeping the state of being parallel to each other.

As described above, the spring 45A is disposed between the first movable body 40A and the first operating portion 22A. Furthermore, the spring 45B is disposed between the second movable body 40B and the second operating portion 22B. The springs 45A and 45B bias the movable bodies 40A and 40B, respectively, in opposite directions to each other. In this example, the spring 45A biases the first movable body 40A in the clockwise direction (in the opposite direction to the rotation of the first movable body 40A due to the translation of the operating shaft 20). On the other hand, the spring 45B biases the second movable body 40B in the anticlockwise direction (in the opposite direction to the rotation of the second movable body 40B due to the translation of the operating shaft 20). Therefore, when the operating shaft 20 is translated in a radial direction thereof, the springs 45A and 45B are twisted by the movable bodies 40A and 40B, respectively, so that the torsional elastic force (rotational force) of the springs 45A and 45B increases. As shown in FIG. 3, both end parts of the spring 45A each engage with a respective one of the movable body 40A and the operating shaft 20, and the spring 45A biases the first movable body 40A in the clockwise direction by the engagement of them. Similarly, both end parts of the spring 45B each engage with a respective one of the second movable body 40B and the operating shaft 20, and the spring 45B biases the second movable body 40B in the anticlockwise direction by the engagement of them.

As shown in FIG. 3, the springs 45A and 45B have arm parts 45c and 45d extending in radial directions at both end parts thereof. The movable bodies 40A and 40B have spring receivers 42 protruding toward the operating portions 22A and 22B and the operating portions 22A and 22B have spring receives 25 protruding toward the movable bodies 40A and 40B. The arm parts 45c and 45d engage with the movable bodies 40A and 40B and the operating portions 22A and 22B, respectively, so that the springs 45A and 45B may be twisted by the movable bodies 40A and 40B. That is, the arm parts 45c and 45d engage with the spring receivers 42 and 25 in the circumferential direction around the operating shaft 20.

The base 30 receives, from the movable bodies 40A and 40B, force by the rotation of the movable bodies 40A and 40B, specifically forces Fa2 and Fb2 (see FIG. 7(b)) attributed to the torsional elastic force of the springs 45A and 45B. In this example, as described above, the base 30 has the engagement protrusions 30a and 30b that abut against the abutting surfaces 41a and 41b in the rotational directions of the movable bodies 40A and 40B (circumferential direction around the operating shaft 20). The forces Fa2 and Fb2 are applied to the base 30 via the engagement protrusions 30a and 30b that rotate the movable bodies 40A and 40B (in the example of FIG. 7(b), 30a-2 and 30b-1) in the plural engagement protrusions 30a and 30b. The amounts of rotation of the movable bodies 40A and 40B are ones depending on the amount of movement of the operating shaft 20 and thus a force of magnitude depending on the amount of movement of the operating shaft 20 is applied to the base 30. As described above, the abutting surfaces 41a and 41b are formed along the straight line L2 that passes through the engagement protrusions 30a and 30b and is along a radial direction. The forces Fa2 and Fb2 acting on the base 30 from the movable bodies 40A and 40B act in the directions of perpendiculars to the abutting surfaces 41a and 41b.

As described above, the movable bodies 40A and 40B are biased by the springs 45A and 45B in the opposite directions to each other and abut against the engagement protrusions 30a and 30b, respectively. Therefore, as shown in FIG. 7(b), when the operating shaft 20 moves in the radial direction, the moment of the base 30 attributed to the force Fa2 acting on the base 30 from the first movable body 40A and the moment of the base 30 attributed to the force Fb2 acting on the base 30 from the second movable body 40B cancel each other out. Furthermore, the movable bodies 40A and 40B abut against the engagement protrusions 30a and 30b of the base 30 in the opposite directions to each other. Therefore, when the operating shaft 20 moves in the radial direction, the engagement protrusion 30a against which the first movable body 40A abuts and the engagement protrusion 30b against which the second movable body 40B abuts are located on the opposite side to each other across the straight line that passes through the Z-axis and is along the movement direction of the operating shaft 20 (Ds). As a result, a resultant force F2 of the forces Fa2 and Fb2 is a force of a direction according to the movement direction of the operating shaft 20.

The force F2 is applied from the base 30 to the sensors 35 to be detected in the second detection directions D2 (see FIG. 5) of the sensors 35. Based on the detected force, the amount and direction of movement of the operating shaft 20 can be calculated. For example, the amount of movement of the operating shaft 20 in the X-axis direction is calculated based on the X-axis direction component of the force detected by the three sensors 35. Furthermore, the amount of movement of the operating shaft 20 in the Y-axis direction is calculated based on the Y-axis direction component of the force detected by the three sensors 35.

In FIG. 7(b), the movement direction of the operating shaft 20 is at the intermediate angle between the engagement protrusion 30a-1 and the engagement protrusion 30a-2. Also when the operating shaft 20 moves in a direction offset from the intermediate angle, the resultant force F2 of the forces Fa2 and Fb2 is in a direction according to the movement direction of the operating shaft 20. For example, as shown in FIG. 8, when the operating shaft 20 moves in a direction inclined toward the engagement protrusions 30a-1 and 30b-1, the amount of rotation of the first movable body 40A is larger than the amount of rotation of the second movable body 40B. Therefore, the force Fa2 is larger than the force Fb2. As a result, the direction of the resultant force F2 in FIG. 8 is also a direction that is inclined toward the engagement protrusions 30a-1 and 30b-1 and is according to the movement direction of the operating shaft 20.

The springs 45A and 45B exert a torsional elastic force in the state in which the operating shaft 20 is at the initial position (in the state of FIG. 7(a)). That is, the springs 45A and 45B are placed in the state in which an initial load that twists these springs 45A and 45B is imposed thereon.

Therefore, the spring 45A exerts an initial torsional elastic force to bias the first movable body 40A in the clockwise direction and the plural abutting surfaces 41a of the first movable body 40A are each pressed against the engagement protrusion 30a in the state in which the operating shaft 20 is at the initial position. Similarly, the spring 45B exerts an initial torsional elastic force to bias the second movable body 40B in the anticlockwise direction and the plural abutting surfaces 41b of the second movable body 40B are each pressed against the engagement protrusion 30b. The operating shaft 20 is biased to the initial position by this initial torsional elastic force. That is, the translation of the operating shaft 20 in a radial direction starts when a force exceeding the initial torsional elastic force of the springs 45A and 45B is applied to the operating shaft 20. Due to this, the motion of the operating shaft 20 not intended by the user is suppressed and the operability of the operating shaft 20 can be enhanced.

As described above, the springs 45A and 45B are placed in such a state as to exert the initial compressive elastic force of the axial direction of the operating shaft 20. The initial compressive elastic force of the axial direction works as a force that resists the start of the movement of the operating shaft 20 in the axial direction. Furthermore, the initial torsional elastic force of the springs 45A and 45B works as a force that resists the start of the movement of the operating shaft 20 in the radial direction. This initial compressive elastic force of the axial direction and the initial torsional elastic force can be separately set. Therefore, the operating force required for the movement of the operating shaft 20 in the radial direction and the operating force required for the movement of the operating shaft 20 in the axial direction can be separately set. For example, when the compressive deformation of the springs 45A and 45B in the initial state is made larger with the initial torsional elastic force (the amount of twist in the initial state) of the springs 45A and 45B kept, the initial compressive elastic force of the axial direction can be increased. This allows the operating force required for the motion of the operating shaft 20 in the axial direction to be made larger than the operating force required for the motion of the operating shaft 20 in the radial direction.

Furthermore, the movable bodies 40A and 40B are supported by the horizontal upper surface and lower surface, respectively, of the base 30. When the operating shaft 20 moves in a radial direction, the movable bodies 40A and 40B move (rotate) on the upper surface and lower surface of the base 30 and are not displaced in the axial direction of the operating shaft 20. Furthermore, one ends of the springs 45A and 45B are supported by the movable bodies 40A and 40B and the other ends are supported by the operating shaft 20. Therefore, when the operating shaft 20 moves in a radial direction, the springs 45A and 45B move in the radial direction together with the operating shaft 20 and the initial compressive elastic force in the axial direction of the operating shaft 20 continues to act on the movable bodies 40A and 40B. As a result, an unintentional tilt of the operating shaft 20 when the user moves the operating shaft 20 in the radial direction can be suppressed.

Figure 11:
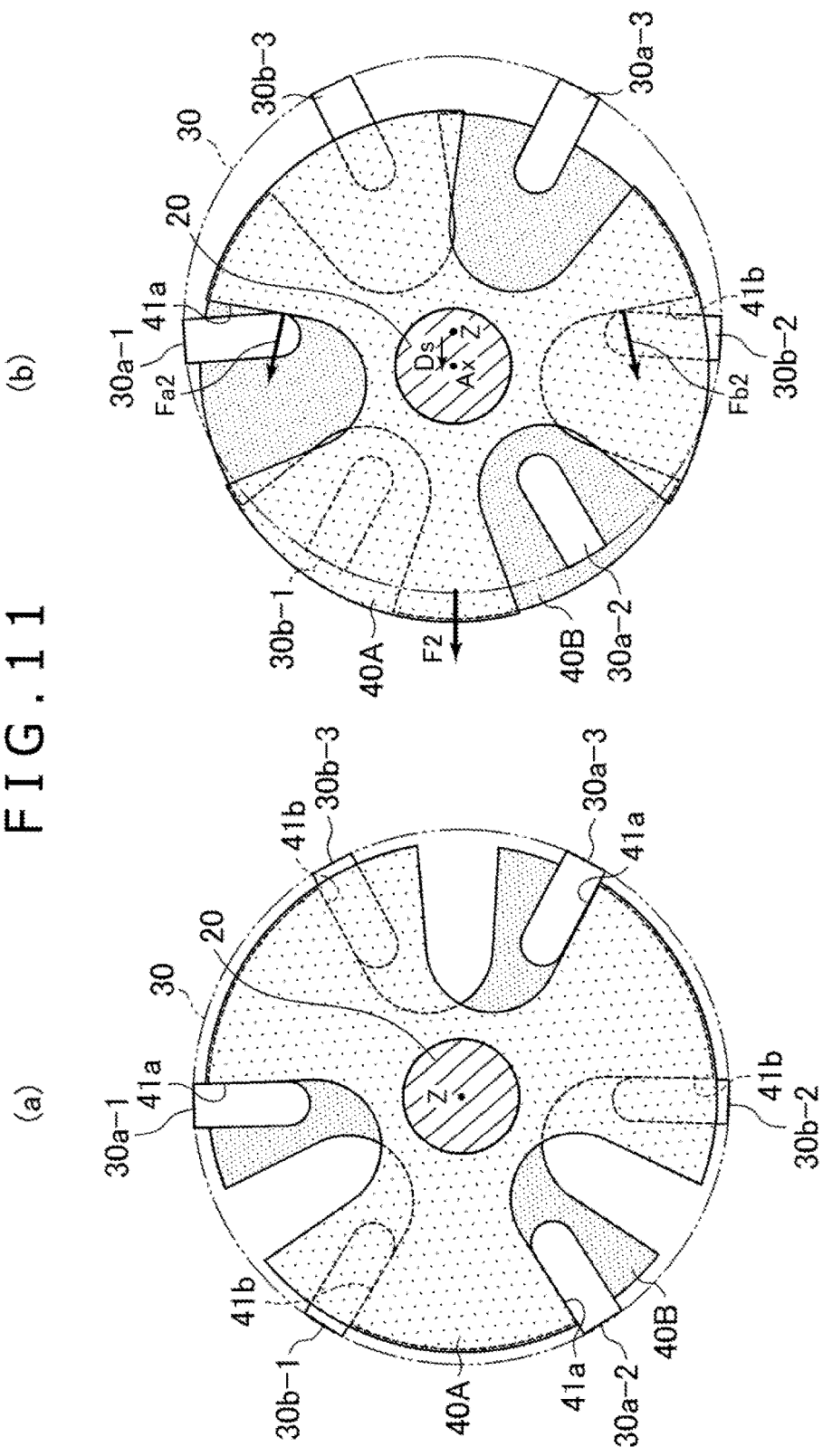
FIG. 11 is a diagram for explaining a modification example of the movable bodies configuring the operating shaft assembly.

The angular positions of the engagement protrusions 30a in the circumferential direction of the operating shaft 20 do not necessarily need to correspond with the angular positions of the engagement protrusions 30b in the circumferential direction of the operating shaft 20. FIG. 11 is a diagram for explaining a form in which the engagement protrusions 30a and the engagement protrusions 30b are located with an offset in the circumferential direction. Also in this diagram, numerals 30a-1 to 30a-3 indicate three engagement protrusions 30a and numerals 30b-1 to 30b-3 indicate three engagement protrusions 30b. In the following description, numerals 30a-1 to 30a-3 and 30b-1 to 30b-3 are used in the case of representing the specific engagement protrusions 30a and 30b.

The engagement protrusions 30a in this diagram are located with an offset of 60 degrees relative to the engagement protrusions 30b. As shown in FIG. 11(a), in this example, the abutting surface 41a of the first movable body 40A abuts against the side surface oriented in the clockwise direction in the outer surface of the engagement protrusion 30a. On the other hand, the abutting surface 41b of the second movable body 40B abuts against the side surface oriented in the anticlockwise direction in the outer surface of the engagement protrusion 30b. Also in this structure, the resultant force of a force acting on the base 30 from the first movable body 40A at the time of the movement of the operating shaft 20 in a radial direction and a force acting on the base 30 from the second movable body 40B is in a direction according to the movement direction of the operating shaft 20.

In the example shown in FIG. 11(b), the operating shaft 20 moves in the left direction (in a direction Ds in the diagram). The first movable body 40A rotates in the clockwise direction due to the abutting of the engagement protrusion 30a-1 and the abutting surface 41a and the force Fa2 attributed to the torsional elastic force of the spring 45A acts on the engagement protrusion 30a-1 from the first movable body 40A. Meanwhile, the second movable body 40B rotates in the anticlockwise direction due to the abutting of the engagement protrusion 30b-2 and the abutting surface 41b and the force Fb2 attributed to the torsional elastic force of the spring 45B acts on the engagement protrusion 30b-2 from the second movable body 40B. Also in this example, the movable bodies 40A and 40B are biased in opposite directions to each other by the springs 45A and 45B and thus the moment acting on the base 30 due to the force Fa2 and the moment acting on the base 30 due to the force Fb2 cancel each other out. Furthermore, the engagement protrusion 30a that rotates the first movable body 40A (30a-1, in the example of FIG. 11(b)) and the engagement protrusion 30b that rotates the second movable body 40B (30b-2, in the example of FIG. 11(b)) are located on the opposite side to each other across the straight line that passes through the Z-axis and is along the movement direction of the operating shaft 20. Therefore, the resultant force Fb2 of the forces Fa2 and Fb2 is a force of a direction according to the movement direction of the operating shaft 20.

[Structure Relating to Rotation Around Shaft Center]

The initial torsional elastic force of the spring 45A evenly presses the first movable body 40A against the plural engagement protrusions 30a in the clockwise direction. The initial torsional elastic force of the spring 45B evenly presses the second movable body 40B against the plural engagement protrusions 30b in the anticlockwise direction. In the state in which the operating shaft 20 is at the initial position, these two forces balance each other out.

The first movable body 40A can abut against the operating shaft 20 in the circumferential direction of this operating shaft 20 as described in detail later. Furthermore, due to the abutting of them, when the operating shaft 20 rotates in the direction in which the first movable body 40A separates from the engagement protrusions 30a (in this example, anticlockwise direction), the first movable body 40A rotates integrally with the operating shaft 20. As described above, the spring 45B and the second movable body 40B are disposed on the opposite side to the first movable body 40A across the base 30. The spring 45B engages with the second movable body 40B and the operating portion 22B of the operating shaft 20 and biases the second movable body 40B in the anticlockwise direction. In other words, the spring 45B biases the operating shaft 20 in the clockwise direction. Due to this structure, when the operating shaft 20 rotates in the anticlockwise direction, a force according to the amount of rotation of the operating shaft 20 acts on the base 30.

Specifically, as shown in FIG. 9(b), when the operating shaft 20 rotates in the anticlockwise direction (rotates in a direction Dr in FIG. 9(b)), the abutting surfaces 41a of the first movable body 40A separate from the engagement protrusions 30a of the base 30. At this time, the spring 45B is twisted due to the rotation of the operating shaft 20 relative to the second movable body 40B. The torsional elastic force of the spring 45B has magnitude according to the amount of rotation of the operating shaft 20 and forces F3 attributed to the torsional elastic force act on the base 30 via the second movable body 40B. An anticlockwise rotational force acts on the base 30 due to the forces F3 each acting on a respective one of the plural engagement protrusions 30b. The plural engagement protrusions 30b are formed on the base 30 at equal intervals in the circumferential direction. Therefore, the forces F3 each acting on a respective one of the plural engagement protrusions 30b cancel each other out in the X-axis direction and the Y-axis direction.

The second movable body 40B can also abut against the operating shaft 20 in the circumferential direction of this operating shaft 20 as described in detail later. Due to the abutting of them, when the operating shaft 20 rotates in the direction in which the second movable body 40B separates from the engagement protrusions 30b of the base 30 (in this example, clockwise direction), the second movable body 40B rotates integrally with the operating shaft 20. As described above, the spring 45A and the first movable body 40A are disposed on the opposite side to the second movable body 40B across the base 30. The spring 45A engages with the first movable body 40A and the operating portion 22A of the operating shaft 20. Furthermore, the spring 45A biases the first movable body 40A in the clockwise direction and biases the operating shaft 20 in the anticlockwise direction. Therefore, also when the operating shaft 20 rotates in the clockwise direction, a force according to the amount of rotation of the operating shaft 20 acts on the base 30. Specifically, when the operating shaft 20 rotates in the clockwise direction, the abutting surfaces 41b of the second movable body 40B separate from the engagement protrusions 30b of the base 30. Furthermore, at this time, the spring 45A is twisted due to the rotation of the operating shaft 20 relative to the first movable body 40A. The torsional elastic force of the spring 45A has magnitude according to the amount of rotation of the operating shaft 20 and forces attributed to the torsional elastic force (clockwise rotational forces) act on the base 30 via the first movable body 40A. The plural engagement protrusions 30a are formed on the base 30 at equal intervals in the circumferential direction. Therefore, the forces each acting on a respective one of the plural engagement protrusions 30a cancel each other out in the X-axis direction and the Y-axis direction.

Due to the rotational force acting on the base 30, forces of the second detection directions D2 (see FIG. 5) evenly act on the three sensors 35. Therefore, based on the forces detected by the sensors 35 in the second detection directions D2, the amount of rotation of the operating shaft 20 around the shaft center and the rotational direction thereof (clockwise or anticlockwise) are detected.

As shown in FIGS. 2 and 9(a), the shaft parts 24A and 24B of the operating shaft 20 of this example have protrusions 24a and 24b protruding from their outer surfaces. In this example, the protrusions 24a and 24b extend from the large-diameter part 23 in opposite directions to each other along the shaft center of the operating shaft 20. The holes in which the shaft parts 24A and 24B of the operating shaft 20 are inserted are formed in the movable bodies 40A and 40B, respectively, and a notch 43 is formed in the inner circumferential surface of this hole. In the state in which the operating shaft 20 is at the initial position, the protrusion 24a abuts against a surface 43a oriented in the clockwise direction in the inner surface of the notch 43 of the first movable body 40A. Due to this, when the operating shaft 20 rotates in the anticlockwise direction, the first movable body 40A rotates together with the operating shaft 20. Similarly, in the initial state of the operating shaft 20, the protrusion 24b abuts against a surface 43b oriented in the anticlockwise direction in the inner surface of the notch 43 of the second movable body 40B. Due to this, when the operating shaft 20 rotates in the clockwise direction, the second movable body 40B rotates together with the operating shaft 20. The width of the notches 43 in the circumferential direction of the operating shaft 20 is larger than the protrusions 24a and 24b. This permits the clockwise rotation of the operating shaft 20 relative to the first movable body 40A and the anticlockwise rotation of the operating shaft 20 relative to the second movable body 40B.

As shown in FIG. 9(a), in the state in which the operating shaft 20 is at the initial position, the surface 43a of the notch 43 of the first movable body 40A and the surface 43b of the notch 43 of the second movable body 40B clamp the protrusions 24a and 24b through the initial torsional elastic force of the springs 45A and 45B. Therefore, the rotation of the operating shaft 20 around the shaft center is also suppressed by the initial torsional elastic force of the springs 45A and 45B. The rotation of the operating shaft 20 around the shaft center starts when a rotational force exceeding this initial torsional elastic force is applied to the operating shaft 20.

[Structure Relating to Tilt]

The movable bodies 40A and 40B hold the operating shaft 20 as described above and can move in the axial direction relative to the operating shaft 20. Furthermore, the movable bodies 40A and 40B can move from the base 30 in opposite directions to each other. That is, the first movable body 40A can move in the axial direction of the operating shaft 20 toward the first operating portion 22A and the second movable body 40B can move in the axial direction of the operating shaft 20 toward the second operating portion 22B. Due to this structure, as shown in FIG. 10, the movable bodies 40A and 40B can tilt relative to the base 30, i.e. to the horizontal plane including the X-axis and the Y-axis. As a result, the operating shaft 20 can rotate (tilt) around an axis Ax along a radial direction at an arbitrary angle.

As shown in FIG. 10, when the operating shaft 20 tilts around the axis Ax, the movable bodies 40A and 40B abut against the base 30 at only positions on the opposite side to each other across the axis Ax. Furthermore, the movable bodies 40A and 40B apply forces of the Z-axis direction in opposite directions to each other to the base 30 at these contact points. Specifically, when the operating shaft 20 tilts, the first movable body 40A has a contact point Pa5 to the base 30 on the side toward which the first operating portion 22A moves (left side in the example of FIG. 10) and tilts around the contact point Pa5. Thereby, the distance between the first movable body 40A and the first operating portion 22A is shortened and the spring 45A is elastically deformed (compressed). The force F5 of the negative direction of the Z-axis attributed to the elastic deformation of the spring 45A acts on the base 30 via the contact point Pa5. Furthermore, when the operating shaft 20 tilts, the second movable body 40B has a contact point Pb5 on the side toward which the second operating portion 22B moves (right side in the example of FIG. 10), i.e. on the opposite side to the contact point Pa5 across the center axis Ax of the tilt. The second movable body 40B tilts around the contact point Pb5. Thereby, the distance between the second movable body 40B and the second operating portion 22B is shortened and the spring 45B is elastically deformed. The force F5 of the positive direction of the Z-axis attributed to the elastic deformation of the spring 45B acts on the base 30 via the contact point Pb5. That is, a moment around the axis Ax acts on the base 30.

The sensors 35 detect the force of the Z-axis direction according to the forces F5. The amount of tilt (amount of rotation) of the operating shaft 20 can be calculated from the force detected by the sensors 35 in the first detection direction D1. The amount of rotation of the operating shaft 20 around the X-axis is calculated based on the moment around the X-axis, of the force detected by the respective sensors 35 in the first detection direction D1 (see FIG. 5) for example. The amount of rotation of the operating shaft 20 around the Y-axis is calculated based on the moment around the Y-axis, of the force detected by the respective sensors 35 in the first detection direction D1 for example.

As described above, when the operating shaft 20 is at the initial position, the springs 45A and 45B press the movable bodies 40A and 40B, respectively, against the base 30 by the initial compressive elastic force of them. The tilt of the operating shaft 20 is suppressed by this initial compressive elastic force. Furthermore, the tilt of the operating shaft 20 starts when an operating force exceeding this initial compressive elastic force is applied.

As described above, the movable bodies 40A and 40B can rotate relative to the operating shaft 20 in the circumferential direction of the operating shaft 20. Furthermore, the movable bodies 40A and 40B engage with the engagement protrusions 30a and 30b, respectively, at positions separate from the rotation center of the movable bodies 40A and 40B. Moreover, the movable bodies 40A and 40B rotate relative to the operating shaft 20 through the engagement with the engagement protrusions 30a and 30b according to the translation of the operating shaft 20 in a radial direction. The base 30 abuts against the movable bodies 40A and 40B in the rotational directions of the movable bodies 40A and 40B and receives a force due to the movement of the operating shaft 20 from the movable bodies 40A and 40B. The sensors 35 detect the force acting on the base 30. According to this structure, a novel operating device allowing detection of the translation of the operating shaft 20 is implemented.

The movable bodies 40A and 40B engage with the operating shaft 20 in such a manner that, when the operating shaft 20 rotates around its shaft center, the movable bodies 40A and 40B rotate together with this operating shaft 20. According to this structure, it becomes possible to detect the rotation of the operating shaft 20 around the shaft center.

The engagement protrusions 30a and 30b are formed on the base 30 and abut against the movable bodies 40A and 40B, respectively, in the rotational directions of the movable bodies 40A and 40B. According to this structure, a force is applied to the base 30 via the engagement protrusions 30a and 30b.

The springs 45A and 45B bias the movable bodies 40A and 40B in the opposite direction to the direction of the rotation of the movable bodies 40A and 40B attributed to the translation of the operating shaft 20. According to this structure, the elastic force (in the above-described example, torsional elastic force) of the springs 45A and 45B with magnitude according to the movement of the operating shaft 20 acts on the base 30. As a result, the amount of movement of the operating shaft 20 can be detected.

The base 30 has the plural engagement protrusions 30a and 30b arranged at intervals along the circumferential direction of the operating shaft 20. According to this structure, the directions in which the movement of the operating shaft 20 can be detected can be increased.

The engagement protrusions 30a and the engagement protrusions 30b are formed on the base 30. The first movable body 40A rotates in the anticlockwise direction through the engagement with the engagement protrusions 30a according to the translation of the operating shaft 20 in a radial direction. The second movable body 40B rotates in the clockwise direction through the engagement with the engagement protrusions 30b according to the translation of the operating shaft 20 in a radial direction. According to this structure, the first movable body 40A and the second movable body 40B rotate in the opposite directions to each other. Therefore, when the operating shaft 20 moves in a radial direction, it is possible to suppress acting of a rotational force on the base 30 and apply a force of a direction according to the movement direction of the operating shaft 20 to the base 30. As described above, the first movable body 40A is in contact with the horizontal upper surface of the base 30 and the second movable body 40B is in contact with the horizontal lower surface of the base 30. The movable bodies 40A and 40B are parallel to each other. When the operating shaft 20 moves in a radial direction thereof, the movable bodies 40A and 40B rotate in the opposite directions to each other while keeping the state of being parallel to each other.

The movable bodies 40A and 40B hold the operating shaft 20 relatively rotatably and can tilt relative to the base 30 according to the tilt of the operating shaft 20. The springs 45A and 45B are attached to the operating shaft 20 and the movable bodies 40A and 40B in such a manner as to press the movable bodies 40A and 40B, respectively, against the base 30 in the axial direction of the operating shaft 20 and are translated in the radial direction together with the operating shaft 20. This can suppress the tilt of the operating shaft 20 against the intention of the user when the user translates the operating shaft 20 in a radial direction.

Each of the springs 45A and 45B generates elastic forces of two directions. Specifically, the springs 45A and 45B generate an elastic force (compressive elastic force) in the axial direction attributed to the motion of the operating shaft 20 in the axial direction (Z-axis direction) and an elastic force (torsional elastic force) of a direction along a plane perpendicular to the axial direction, attributed to the motion of the operating shaft 20 in the plane perpendicular to the axial direction (translation in a radial direction and rotation around the shaft center). The base 30 receives the elastic force in the axial direction and the elastic force of a direction along the plane perpendicular to the axial direction. The sensors 35 detect a force according to the elastic force acting on the base 30. According to this, it becomes possible to detect both the amount of movement of the operating shaft 20 in its axial direction and the amount of motion in the plane perpendicular to the axial direction and the operation modes of the operating shaft 20 can be increased. In the case of intending to apply the elastic forces of two directions to the base 30 in this manner, each of the springs 45A and 45B does not necessarily need to be formed of a compression and torsion coil spring. That is, the springs 45A and 45B may be formed of coil springs capable of only compressive deformation and other springs that generate the elastic force of a direction along the plane perpendicular to the axial direction may be provided in the operating device.

The springs 45A and 45B are springs that are capable of compressive deformation in the axial direction of the operating shaft 20 and capable of torsional deformation around the operating shaft 20. Furthermore, the springs 45A and 45B generate a force by the compressive deformation as the elastic force in the axial direction of the operating shaft 20 and generate a force by the torsional deformation as the elastic force of a direction along the plane perpendicular to the axial direction of the operating shaft 20. According to this structure, the number of springs used in the operating device 1 can be decreased.

In the state in which the operating shaft 20 is at the initial position, the springs 45A and 45B exert an initial compressive elastic force in the axial direction and an initial elastic force (in the above description, initial torsional elastic force) of a direction along the plane perpendicular to the axial direction. According to this structure, the operating force required for the movement of the operating shaft 20 in the radial direction and the operating force required for the movement of the operating shaft 20 in the axial direction can be separately set.

The operating device 1 includes the movable bodies 40A and 40B that rotate around the operating shaft 20 according to the translation of the operating shaft 20 in a radial direction. One end of the spring 45A and one end of the spring 45B are attached to the movable bodies 40A and 40B, respectively. According to this, the amount of movement of the operating shaft 20 in the radial direction can be detected by utilizing the torsional deformation of the springs 45A and 45B.

The present invention is not limited to the operating device 1 described above and various changes are possible.

For example, only the first operating portion 22A may be provided in the operating shaft 20 and the second operating portion 22B does not necessarily need to be provided.

Furthermore, instead of the engagement protrusion 30a and the engagement recess 41, an engagement protrusion protruding toward the base 30 may be formed on the first movable body 40A and an engagement recess in which this engagement protrusion is internally disposed may be formed in the base 30. Similarly, an engagement protrusion protruding toward the base 30 may be formed on the second movable body 40B and an engagement recess in which this engagement protrusion is internally disposed may be formed in the base 30.

Moreover, the engagement protrusions 30a and 30b that rotate the movable bodies 40A and 40B do not necessarily need to be formed on the base 30. For example, engagement protrusions may be formed on a member different from the base 30.

Furthermore, the operating shaft 20 is capable of translation in its axial direction, translation in the radial direction, tilt, and rotation around the shaft center. However, all of these kinds of motion of the operating shaft 20 do not necessarily need to be permitted.

Moreover, the operating device may include only either one of the movable bodies 40A and 40B and the other does not necessarily need to be provided.

Figure 12:
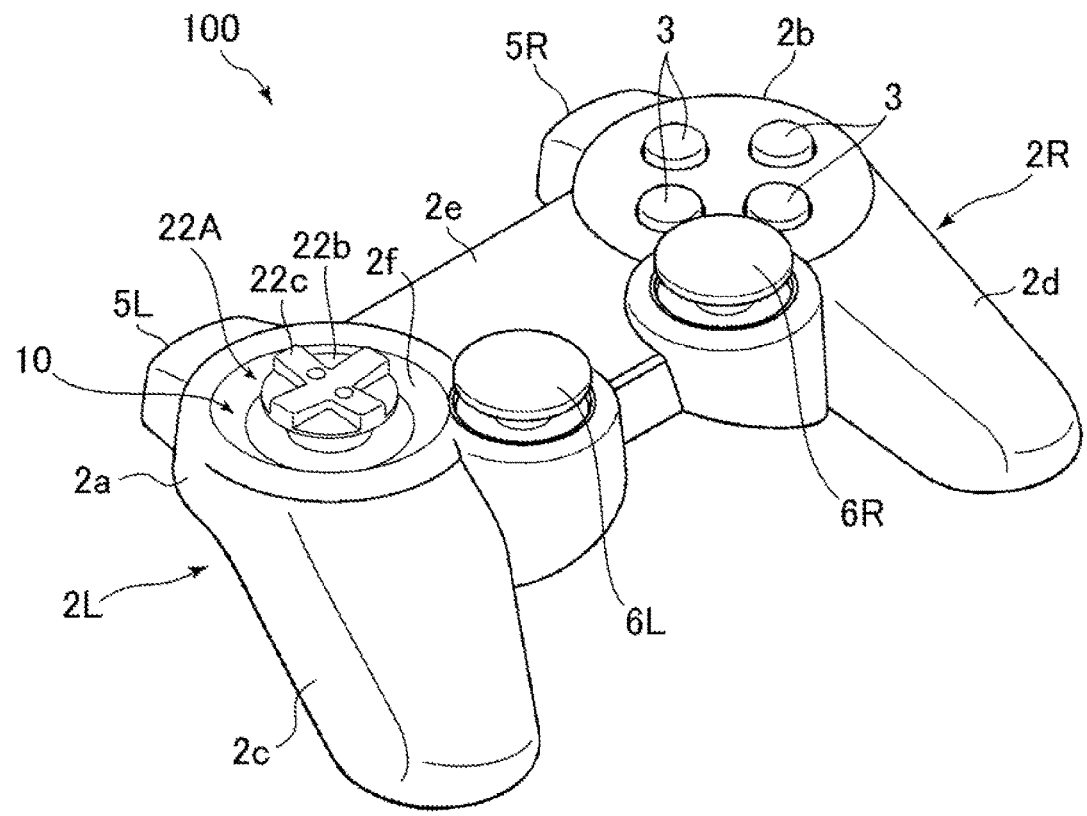
FIG. 12 is a perspective view of an operating device according to another embodiment of the present invention.

Furthermore, at the held portion 2L of the operating device 1, the operating shaft assembly 10 may be provided instead of the direction keys 4. Moreover, at the held portion 2R of the operating device 1, the operating shaft assembly 10 may be provided instead of the buttons 3. FIG. 12 is a perspective view of an operating device 100 in which the assembly 10 is provided at the held portion 2L.

In the operating device 100, the operating shaft assembly 10 is housed at the front part 2a of the held portion 2L. The operating portion 22A is exposed in the upper surface of the held portion 2L and the operating portion 22B (see FIG. 3) is exposed in the lower surface of the held portion 2L. A concave part 2f is formed in the upper surface of the front part of the held portion 2L and the operating portion 22A is disposed inside the concave part 2f. This can prevent an external force from acting on a mechanism included in the operating shaft assembly 10 (e.g. springs 45A and 45B) via the operating portion 22A when the operating device 100 is not used.

The held portion 2L has the grip 2c. The grip 2c extends from the part at which the operating shaft assembly 10 is provided rearward, i.e. toward the user. That is, the operating shaft 20 is located in the extension direction of the grip 2c with respect to this grip 2c. Such a layout allows the user to grasp the grip 2c when operating the operating shaft 20 and stably move the operating shaft 20. For example, the user can clasp the operating shaft 20 with the thumb disposed on the operating portion 22A and the index finger or middle finger disposed on the operating portion 22B and move this operating shaft 20. Specifically, the user can translate the operating shaft 20 in its radial direction, tilt it, and move it in the vertical direction.

A button 5L is disposed on the front surface of the held portion 2L and is located in front of the operating shaft 20. The button 5L is also located in the extension direction of the grip 2c with respect to the grip 2c. The position of the operating portion 22B and the position of the button 5L are comparatively close and thus the user can easily change the position of a finger (e.g. index finger) between the operating portion 22B and the button 5L. A button 5R is provided on the front surface of the held portion 2R.

A chassis 102 of the operating device 100 has a substantially laterally symmetrical shape and has the held portion 2R on the opposite side to the held portion 2L. The held portion 2R has the plural (in this example, four) buttons 3 on the upper surface of its front part. The held portion 2R also has the grip 2d extending from its front part 2b rearward. This allows the user to operate the operating device 100 while grasping the held portion 2R to support the operating device 100. As a result, operation with use of both of the operating portion 22A and the operating portion 22B (e.g. translation of the operating shaft 20) can be easily carried out. In this example, the buttons 3 and the operating portion 22A of the assembly 10 are located on the opposite side to each other and therefore it is easy to operate the operating portions 22A and 22B while operating the buttons 3. The front part of the held portion 2R and the front part of the held portion 2L are connected by the connecting portion 2e. It is also possible for the user to grasp the connection portion 2e with one hand and move the operating portions 22A and 22B with the other hand.

The operating device 100 has an operating stick 6L between the grip 2c of the held portion 2L and the connection portion 2e. Furthermore, the operating device 100 has an operating stick 6R also between the grip 2d of the held portion 2R and the connection portion 2e. The operating sticks 6L and 6R protrude upward. The position of the left operating stick 6L and the position of the operating portion 22A of the assembly 10 are comparatively close and thus the user can easily change the position of a finger (e.g. thumb) between the operating portion 22A and the operating stick 6L. Furthermore, the user can move the operating stick 6L disposed on the upper surface of the operating device 100 with the thumb and, simultaneously with this, can move the operating shaft 20 with the middle finger or index finger disposed on the operating portion 22B disposed on the lower surface of the operating device 100. By such operation, for example an object displayed on a display screen can be moved by one operating member (i.e. operating stick 6L or operating shaft 20) and another object associated with this object or the direction of the line of sight in a virtual three-dimensional space displayed on the display screen can be changed by the other operating member.

The invention claimed is:
1. An operating device comprising:
an operating shaft;
an engagement portion located separately from a shaft center of the operating shaft;
a movable body that is capable of rotating relative to the operating shaft in a rotational direction that is a circumferential direction relative to a longitudinal axis of the operating shaft and engages with the engagement portion;
a base that abuts against the movable body in the rotational direction and receives a force due to movement of the operating shaft relative to the movable body; and
a sensor that detects a force acting on the base; wherein
translation, of the operating shaft, in a radial direction relative to the longitudinal axis effects the engagement, by the moveable body, with the engagement portion, which affects the rotating of the movable body.
2. The operating device according to claim 1, wherein the movable body engages with the operating shaft in such a manner as to rotate together with the operating shaft when the operating shaft rotates around the shaft center of the operating shaft.
3. The operating device according to claim 1, wherein the engagement portion is formed on the base and abuts against the movable body in the rotational direction of the movable body.
4. The operating device according to claim 1, further comprising an elastic body that biases the movable body in an opposite direction to direction of rotation of the movable body attributed to translation of the operating shaft.
5. The operating device according claim 1, comprising a plurality of engagement portions that each function as the engagement portion and are arranged at intervals along the circumferential direction of the operating shaft.
6. The operating device according claim 1, comprising:
a first engagement portion that functions as the engagement portion;
a second engagement portion that functions as the engagement portion and is located on an opposite side to the first engagement portion across the base;
a first movable body that functions as the movable body and rotates in one direction of clockwise direction and anticlockwise direction through engagement with the first engagement portion according to translation of the operating shaft; and
a second movable body that functions as the movable body and rotates in the other direction of the clockwise direction and the anticlockwise direction through engagement with the second engagement portion according to translation of the operating shaft.
7. The operating device according claim 1, wherein
the movable body holds the operating shaft relatively rotatably and is capable of tilting relative to the base according to tilt of the operating shaft, and
the operating device has an elastic body attached to the operating shaft and the movable body in such a manner as to press the movable body to the base in axial direction of the operating shaft and be translated together with the operating shaft.
8. An operating device comprising:
an operating shaft capable of first motion that is motion in axial direction and second motion that is motion in a plane perpendicular to the axial direction;
at least one spring that is a spring that receives motion of the operating shaft to be elastically deformed, the at least one spring generating an elastic force of a first direction that is the axial direction of the operating shaft according to the first motion and generating an elastic force of a second direction that is a direction along the plane perpendicular to the axial direction according to the second motion; and
a sensor that detects a force according to the elastic force of the first direction and a force according to the elastic force of the second direction; wherein
when the operating shaft translates in a radial direction perpendicular to the axial direction, the force according to the elastic force of the second direction is a force in a circumferential direction perpendicular to the axial direction.
9. The operating device according to claim 8, wherein the at least one spring is a spring capable of compressive deformation in the axial direction and capable of torsional deformation around the operating shaft, and the at least one spring generates a force due to compressive deformation as the elastic force of the first direction and generates a force due to torsional deformation as the elastic force of the second direction.
10. The operating device according to claim 8, wherein the at least one spring exerts an initial elastic force of the first direction and an initial elastic force of the second direction in a state in which the operating shaft is at an initial position.
11. The operating device according to claim 9, wherein the second motion is rotation of the operating shaft around shaft center.
12. The operating device according to claim 9, wherein
the second motion is translation of the operating shaft in a radial direction of the operating shaft,
the operating device includes a movable body that rotates around the operating shaft according to translation of the operating shaft in the radial direction, and
the at least one spring is attached to the movable body.

\* \* \* \* \*